United States Patent
Song et al.

(10) Patent No.: US 12,294,666 B2
(45) Date of Patent: May 6, 2025

(54) ELECTRONIC DEVICE INCLUDING HINGE COVER

(71) Applicants: SAMSUNG ELECTRONICS CO., LTD., Suwon-si (KR); FUSEPROJECT, San Francisco, CA (US)

(72) Inventors: Junyong Song, Suwon-si (KR); Byoungjin Kim, Suwon-si (KR); Sejung Whang, Suwon-si (KR); Nakyoung Lee, Suwon-si (KR); Valentin Sollier, San Francisco, CA (US); Yves Behar, San Francisco, CA (US); Qin Li, South San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 17/733,066

(22) Filed: Apr. 29, 2022

(65) Prior Publication Data
US 2022/0353354 A1    Nov. 3, 2022

Related U.S. Application Data

(63) Continuation of application No. PCT/KR2022/006042, filed on Apr. 27, 2022.

(30) Foreign Application Priority Data

Apr. 30, 2021 (KR) ................ 10-2021-0056837

(51) Int. Cl.
H04M 1/02    (2006.01)
(52) U.S. Cl.
CPC ................. *H04M 1/0216* (2013.01)

(58) Field of Classification Search
CPC .................................................. H04M 1/0216
See application file for complete search history.

(56) References Cited

U.S. PATENT DOCUMENTS 7,082,318 B2 *  7/2006  Wilson ............... H04M 1/0216
                                                            455/90.3
9,348,450 B1 *  5/2016  Kim ..................... H04M 1/0268
(Continued)

FOREIGN PATENT DOCUMENTS

CN    207200775        4/2018
JP    2006-283836 A   10/2006
(Continued)

OTHER PUBLICATIONS

Search Report and Written Opinion issued Aug. 12, 2022 in counterpart International Patent Application No. PCT/KR2022/006042.
(Continued)

*Primary Examiner* — Said M Elnoubi
(74) *Attorney, Agent, or Firm* — Nixon & Vanderhye P.C.

(57) ABSTRACT

According to various embodiments of the disclosure, an electronic device may include: a first housing, a second housing rotatably coupled with the first housing and configured to rotate between a first position at which the second housing at least partially faces the first housing and a second position at which the second housing is unfolded at a specified angle from the first position, a hinge module including a hinge providing at least one folding axis and rotatably coupling the first housing and the second housing about the folding axis, and a hinge cover disposed between the first housing and the second housing and coupled to surround at least a part of the hinge module, and at least one part of the hinge cover may be configured to be located closer to the hinge module at the second position than at the first position.

15 Claims, 12 Drawing Sheets

(56) References Cited

U.S. PATENT DOCUMENTS

| | | | | |
|---|---|---|---|---|
| 10,551,880 | B1* | 2/2020 | Ai | G06F 1/1641 |
| 10,890,951 | B1* | 1/2021 | Watamura | G06F 1/1681 |
| 2013/0002114 | A1* | 1/2013 | Hamers | G06F 1/1681 |
| | | | | 312/326 |
| 2016/0327993 | A1* | 11/2016 | Garelli | G06F 1/1681 |
| 2018/0024596 | A1* | 1/2018 | Park | G06F 1/1681 |
| | | | | 361/679.55 |
| 2018/0146560 | A1 | 5/2018 | Chen et al. | |
| 2018/0196469 | A1 | 7/2018 | Yamauchi et al. | |
| 2018/0335810 | A1* | 11/2018 | Wu | G06F 1/1681 |
| 2019/0094918 | A1 | 3/2019 | Lin et al. | |
| 2019/0173983 | A1 | 6/2019 | Han et al. | |
| 2020/0125144 | A1* | 4/2020 | Chung | H04M 1/0216 |
| 2020/0264673 | A1 | 8/2020 | Kim et al. | |
| 2020/0264674 | A1 | 8/2020 | Km et al. | |
| 2020/0314222 | A1 | 10/2020 | Kim et al. | |
| 2020/0382627 | A1 | 12/2020 | Park et al. | |
| 2020/0400960 | A1* | 12/2020 | Pombo | G02C 5/2227 |
| 2021/0026406 | A1 | 1/2021 | Kim et al. | |
| 2022/0061175 | A1 | 2/2022 | Oh et al. | |
| 2022/0240637 | A1 | 8/2022 | Kim et al. | |
| 2022/0357777 | A1* | 11/2022 | Moon | G06F 1/1652 |
| 2023/0134745 | A1* | 5/2023 | Moon | G06F 1/1681 |
| | | | | 361/679.27 |
| 2023/0185338 | A1 | 6/2023 | Seo et al. | |

FOREIGN PATENT DOCUMENTS

| | | | |
|---|---|---|---|
| JP | 2009-260751 A | 11/2009 | |
| JP | 2018112834 A * | 7/2018 | G06F 1/1616 |
| JP | 2020-067907 A | 4/2020 | |
| JP | 2020-118750 | 8/2020 | |
| JP | 2021-018419 A | 2/2021 | |
| KR | 10-2017-0136315 | 12/2017 | |
| KR | 10-2019-0020158 | 2/2019 | |
| KR | 10-2020-0067799 | 6/2020 | |
| KR | 10-2020-0101238 | 8/2020 | |
| KR | 10-2020-0101241 | 8/2020 | |
| KR | 10-2158620 | 9/2020 | |
| KR | 10-2020-0114206 | 10/2020 | |
| KR | 10-2020-0117780 | 10/2020 | |
| KR | 10-2020-0125887 | 11/2020 | |
| KR | 10-2020-0137948 | 12/2020 | |
| KR | 10-2020-0140582 | 12/2020 | |
| KR | 10-2020-0141820 | 12/2020 | |
| KR | 10-2021-0012090 | 2/2021 | |
| RU | 2683290 C2 | 3/2019 | |
| WO | WO2020-122598 A1 | 6/2020 | |
| WO | 2021/080338 | 4/2021 | |

OTHER PUBLICATIONS

Australian Examination Report dated Jun. 6, 2024 for AU Application No. 2022264402.

Extended European Search Report dated Jun. 25, 2024 for EP Application No. 22796145.5.

Russian Office Action dated May 31, 2024 for RU Application No. 2023131175.

Russian Office Action—Search Report dated May 31, 2024 for RU Application No. 2023131175.

Japanese Office Action dated Nov. 12, 2024 for JP Application No. 2023-566947.

* cited by examiner

ELECTRONIC DEVICE INCLUDING HINGE COVER

CROSS-REFERENCE TO RELATED APPLICATIONS

This application is a continuation of International Application No. PCT/KR2022/006042 designating the United States, filed on Apr. 27, 2022, in the Korean Intellectual Property Receiving Office and claiming priority to Korean Patent Application No. 10-2021-0056837, filed on Apr. 30, 2021, in the Korean Intellectual Property Office, the disclosures of each of which are incorporated by reference herein in their entireties.

BACKGROUND

Field

The disclosure relates to an electronic device, for example, an electronic device including a hinge cover.

Description of Related Art

Along with the development of electronics, information, and communication technologies, various functions are being integrated into one portable communication device or electronic device. For example, a smart phone includes the function of a multimedia player, an imaging device, or an electronic notebook as well as a communication function, and other functions may be implemented in the smart phone through installation of additional applications.

A user may search, select, and obtain more information by accessing a network, not limited to functions (e.g., applications) or information installed in a portable communication device or an electronic device. In accessing the network, although a direct access method (e.g., wired communication) may provide fast and stable communication establishment, it may limit a use area to a fixed location or a certain range of space. In accessing the network, a wireless communication method has few restrictions on location or space and offers a transmission speed and stability gradually reaching the same level as the direct access method. In the future, the wireless access method is expected to establish faster and more stable communication than the direct access method.

As personal or portable electronic devices such as smart phones have been widely used, user demands for portability and ease of use are increasing. For example, a touch screen display may provide a screen, for example, a virtual keypad which serves as an output device outputting visual information and substitutes for a mechanical input device (e.g., a button-type keypad). Accordingly, the portable communication device or electronic device may provide the same or improved usability (e.g., a larger screen), while being miniaturized. On the other hand, it is expected that commercialization of flexible displays, for example, foldable or rollable displays will further improve the portability and ease of use of electronic devices in the future.

In a foldable electronic device including a plurality of housings, a flexible display may be deformed to be folded or unfolded. However, it may be difficult to substantially increase or decrease the actual length or area of the flexible display. In various cases, the folding or unfolding deformation is implemented substantially by relative movements or deformation of mechanical structures, thereby preventing application of an external force (e.g., tension) to the flexible display. In the folding or unfolding operation of the electronic device or the housings, the relative movements or deformation of the mechanical structures may lead to selective exposure of some components to the outside. There may be difficulty in harmonizing the selectively exposed mechanical structures or components with the appearance of the electronic device. For example, when mechanical structures or components suitable for relative movements or deformation are exposed outward, the appearance of the electronic device may be impaired.

The above information is presented as background information only to assist with an understanding of the disclosure. No determination has been made, and no assertion is made, as to whether any of the above might be applicable as prior art with regard to the disclosure.

SUMMARY

Embodiments of the disclosure may provide an electronic device with an exterior which is deformable by, for example, a folding or unfolding operation, while keeping a good appearance.

Embodiments of the disclosure may provide an electronic device including a hinge cover which is in harmony with the appearance of the electronic device and offers a comfortable sense of grip, even when exposed outward.

The problems to be addressed in the disclosure are not limited to the above problems, and additional aspects according to various embodiments will be apparent through the following detailed description.

According to various example embodiments of the disclosure, an electronic device may include: a first housing, a second housing rotatably coupled with the first housing and configured to rotate between a first position at which the second housing at least partially faces the first housing and a second position at which the second housing is unfolded at a specified angle from the first position, a hinge module including a hinge providing at least one folding axis and rotatably coupling the first housing and the second housing about the folding axis, and a hinge cover disposed between the first housing and the second housing and coupled to surround at least a part of the hinge module. At least one part of the hinge cover may be located closer to the hinge module at the second position than at the first position.

According to various example embodiments of the disclosure, an electronic device may include: a first housing, a second housing rotatably coupled with the first housing and configured to rotate between a first position at which the second housing at least partially faces the first housing and a second position at which the second housing is unfolded at a specified angle from the first position, a hinge module including a hinge providing at least one folding axis and rotatably coupling the first housing and the second housing about the folding axis, a flexible display disposed from one face of the first housing to one face of the second housing across an area in which the hinge module is disposed, a hinge cover disposed between another face of the first housing and another face of the second housing and disposed to at least partially surround the hinge module, a first inclined face formed on an edge of the hinge cover, and a second inclined face formed on the first housing or the second housing. The first inclined face and the second inclined face may be located to face each other at the first position. Based on the first housing or the second housing rotating to the second position, the second inclined face may pass the first inclined face and move along an outer face of the hinge cover, and at least one part of the hinge cover may be located closer to the hinge module at the second position than at the first position.

According to various example embodiments of the disclosure, as housings are folded or unfolded, a hinge cover may be moved or deformed in a direction closer to or farther from a hinge module. For example, when the hinge cover is exposed between the housings, the outer face of the hinge cover may be disposed to form a substantially continuous inclined face or curved face without a substantial difference in height from the outer faces of the housings. Accordingly, it is possible to prevent and/or reduce the appearance of an electronic device from becoming poor due to an unnecessary height difference at the boundary between components (e.g., the hinge cover and the housings). In various example embodiments, even when exposed to the outside, the outer face of the hinge cover forms the substantial continuous inclined face or curved face with the outer faces of the housings, thereby improving a sense of grip and alleviating a tactile sense of heterogeneity at the boundary between the components (e.g., the hinge cover and the housings). Various other effects recognized directly or indirectly through this document may be provided.

Other aspect(s), advantage(s), and important component(s) of the disclosure will become apparent to those skilled in the art from the following detailed description of various example embodiments given with reference to the attached drawings.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the attached drawings, similar reference numerals may denote similar parts, components, and/or structures.

DETAILED DESCRIPTION

Figure 1:
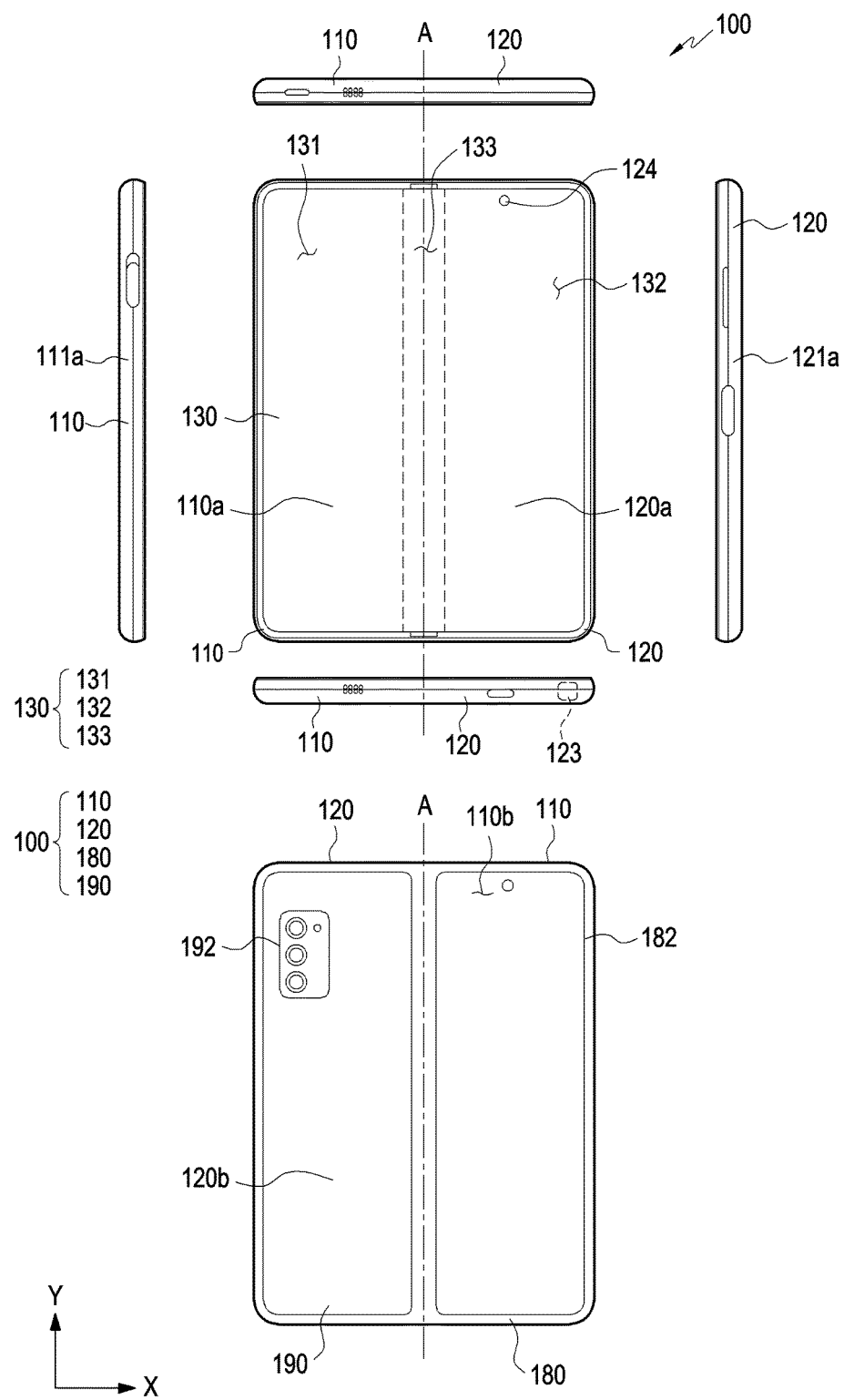
FIG. 1 is a block diagram illustrating an example electronic device in an unfolded state according to various embodiments.

The following description of the appended drawings may be provided to aid in understanding of various example implementations of the disclosure. While various example embodiments are disclosed in the following description include various specific details to aid in understanding, the various embodiments are considered to be non-limiting examples. Accordingly, it will be apparent to those skilled in the art that various changes and modifications can be made to the various implementations described herein without departing from the scope and spirit of the disclosure. For clarity and conciseness, a description of well-known functions and configurations may be avoided.

The terms and words as used in the following description and the claims may be used to clearly and consistently describe the various embodiments of the disclosure, not limited to bibliographical meanings. Therefore, it will be apparent to those skilled in the art that the following description of various embodiments of the disclosure is provided only for illustrative purposes, not for the purpose of limiting the disclosure defined as the scope of rights and their equivalents.

It is to be understood that the singular forms of "a", "an", and "the" include plural referents, unless the context clearly dictates otherwise. Thus, for example, reference to a "component surface" may include one or more of the surfaces of a component.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
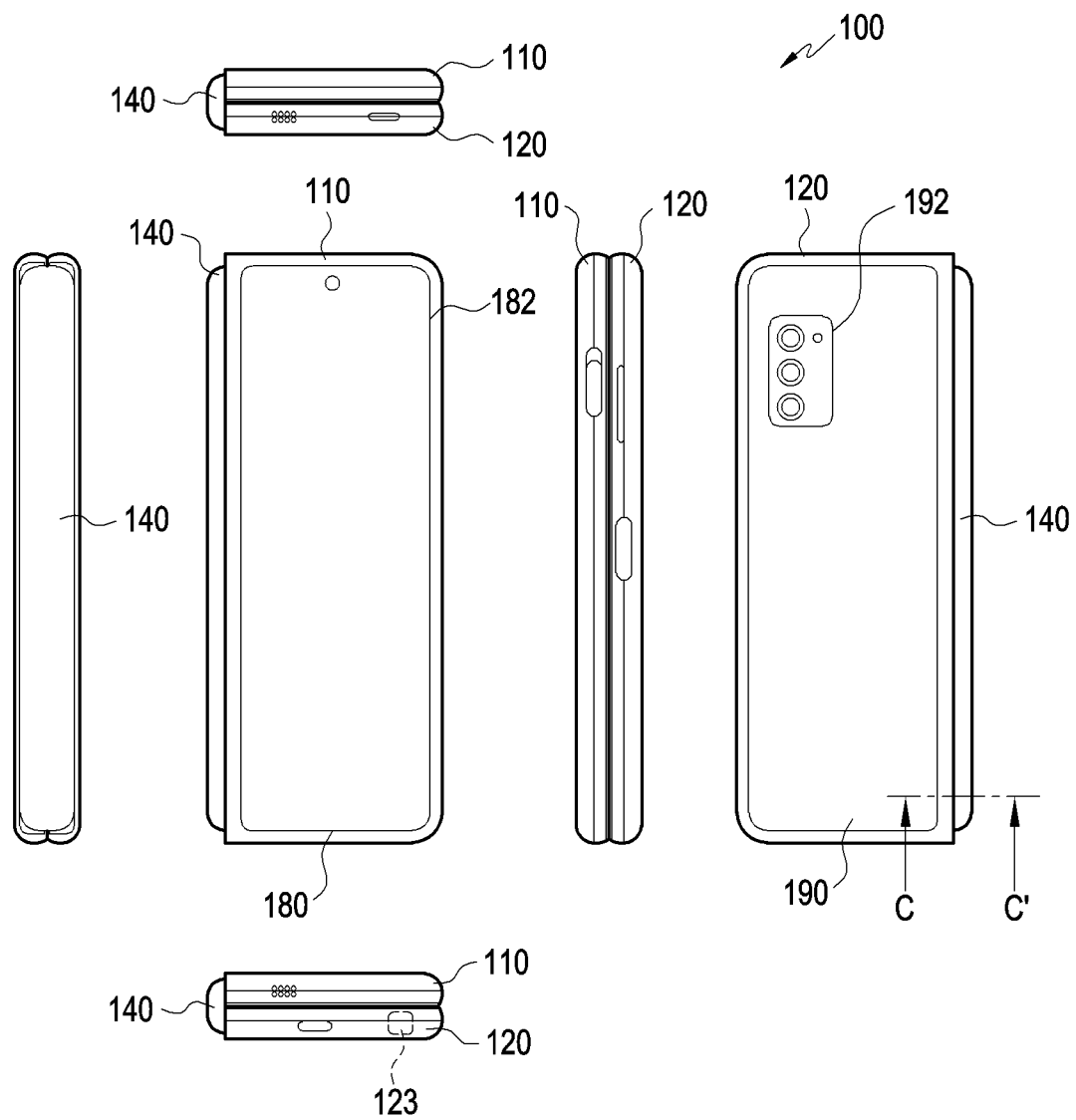
FIG. 2 is a diagram illustrating an electronic device in a folded state according to various embodiments.
Figure 3:
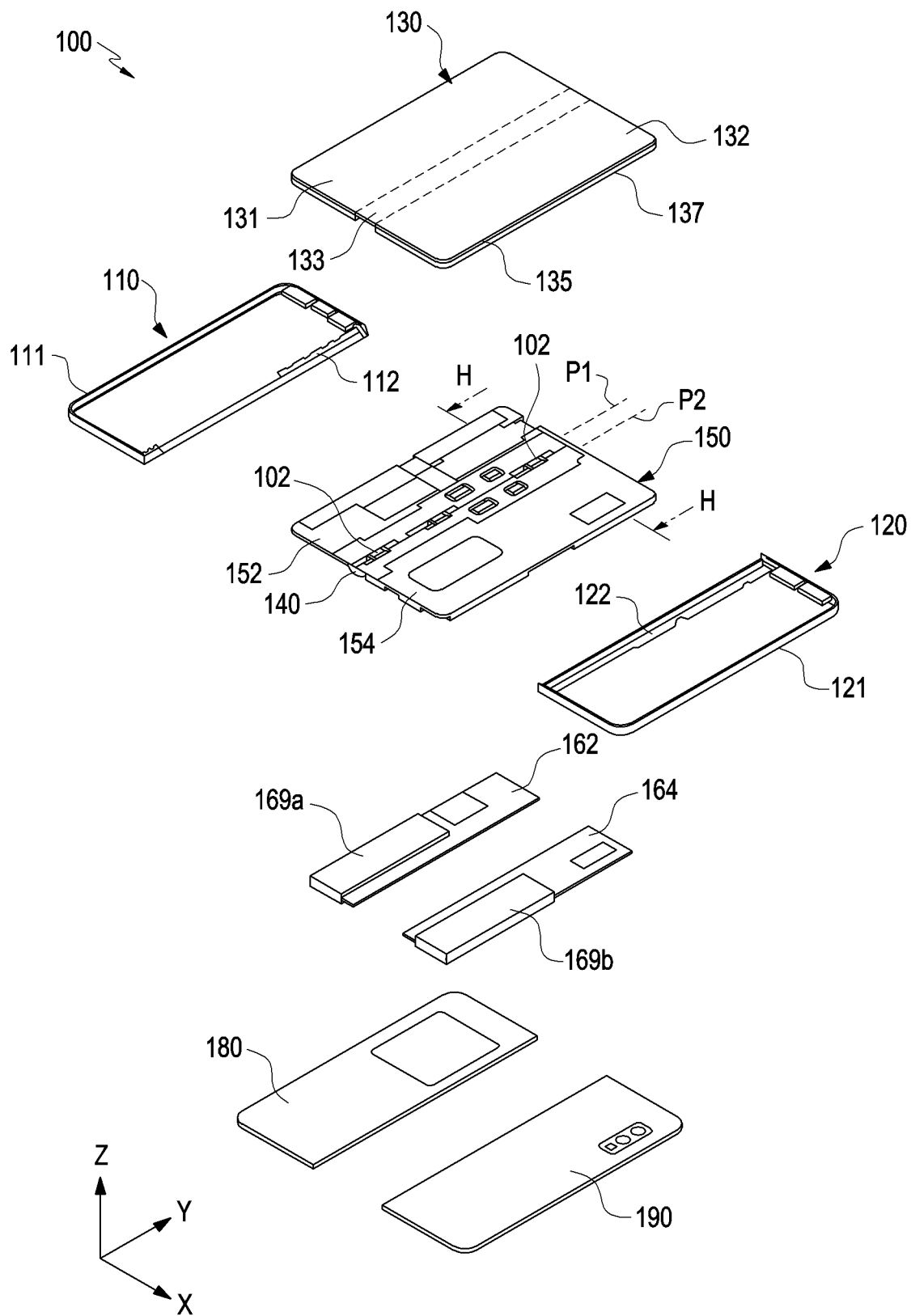
FIG. 3 is an exploded perspective view illustrating an electronic device according to various embodiments.

FIG. 1 is a diagram illustrating an electronic device 100 in an unfolded state according to various embodiments. FIG. 2 is a diagram illustrating the electronic device 100 in a folded state according to various embodiments. FIG. 3 is an exploded perspective view illustrating the electronic device 100 according to various embodiments.

In describing various example embodiments of the disclosure, a configuration in which a pair of housings (e.g., a first housing 110 and a second housing 120) are rotatably coupled with each other by a hinge structure (e.g., a hinge module 102 in FIG. 3) may be taken as an example. However, it is to be noted that this embodiment does not limit the electronic device 100 according to various embodiments of the disclosure. For example, the electronic device 100 according to various embodiments of the disclosure may include three or more housings, and the wording 'a pair of housings' in the embodiments disclosed below may refer, for example, to 'two housings rotatably coupled with each other among three or more housings'.

In the following detailed description, '+X/−X direction', '+Y/−Y direction' or '+Z/−Z direction' may be mentioned, and it is to be noted that the Cartesian coordinate system is generally described below with respect to the width direction X, length direction Y, or thickness direction Z of the first housing 110 in FIG. 1 or 2. For example, according to various embodiments or depending on any other structure set as a reference in the electronic device 100, the definitions of the above directions may vary. In the following detailed description, the 'front face' or 'rear face' of the electronic device 100 or each of the housings 110 and 120 may be mentioned. Regardless of relative positions (e.g., an unfolded state or a folded state) of the housings 110 and 120, a face on which a flexible display 130 of FIG. 1 is disposed is defined as 'the front face of the electronic device 100 (or the front faces of the housings 110 and 120)', and a face facing the opposite direction of the face with the flexible display 130 disposed thereon is defined as 'the rear face of the electronic device 100 (or the rear faces of the housings 110 and 120)'. According to various embodiments, reference may be made to 'a configuration in which the electronic device 100 includes a display' where 'display' may refer to the flexible display 130 in FIG. 1 or 3.

Referring to FIGS. 1 and 2, in an embodiment, the electronic device 100 may include the pair of housings 110 and 120 rotatably coupled to each other, a hinge cover (e.g., a hinge cover 140 in FIG. 3) that covers foldable parts of the housings 110 and 120, and the flexible or foldable display 130 disposed in the space defined by the housings 110 and 120. According to an embodiment, the face on which the display 130 is disposed may be defined as a first face 110a and/or a third face 120a of the electronic device 100 and/or the housings 110 and 120. In an embodiment, a face opposite to the first face 110a and/or the third face 120a may be defined as a second face 110b and/or a fourth face 120b of the electronic device 100 and/or the housings 110 and 120. In an embodiment, a face surrounding the space between the first face 110a and the second face 110b and/or a face surrounding the space between the third face 120a and the fourth face 120b may be defined as a side face (e.g., a first side face 111a and a second side face 121a) of the electronic device 100 and/or the housings 110 and 120.

Figure 4:
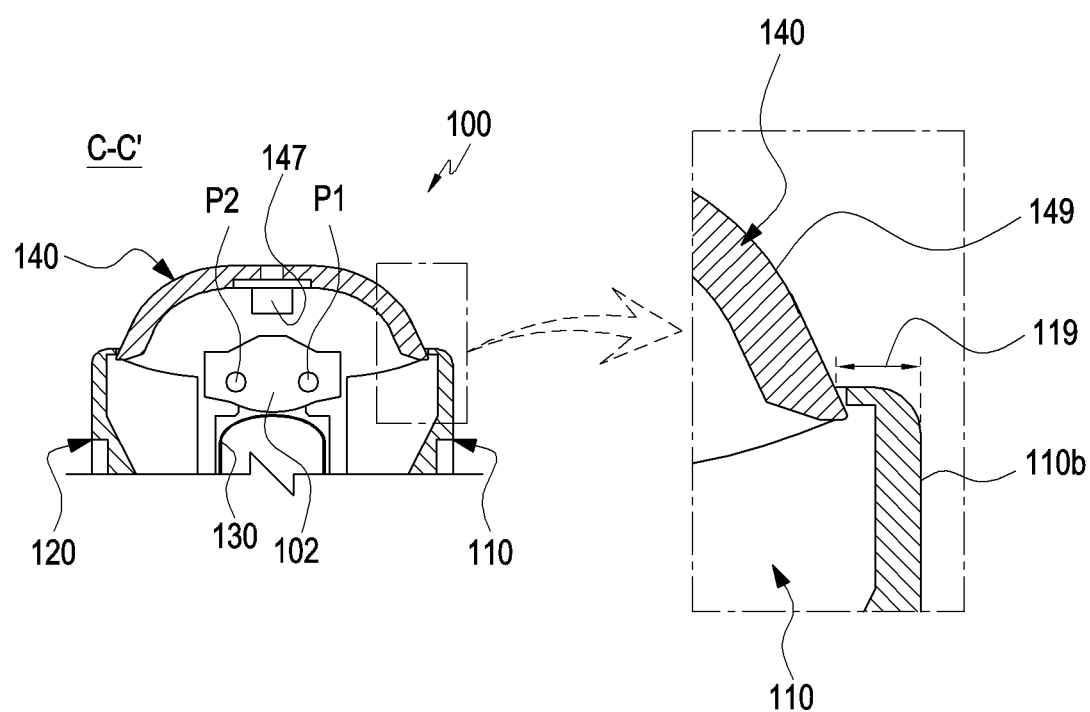
FIG. 4 is a sectional view illustrating an electronic device according to various embodiments.

According to various embodiments, the housings 110 and 120 may include the first housing (or first housing structure) 110, the second housing (or second housing structure) 120 including a sensor area 124, a first rear cover 180, a second rear cover 190, and the hinge structure (e.g., the hinge structure or hinge module 102 in FIG. 4). The housings 110 and 120 of the electronic device 100 may be implemented by combining and/or coupling other shapes or components with each other, not limited to the shape or combination illustrated in FIGS. 1 and 2. For example, in an embodiment, the first housing 110 and the first rear cover 180 may be integrally formed, and the second housing 120 and the second rear cover 190 may be integrally formed.

According to various embodiments, the hinge structure or hinge module 102 may provide at least one folding axis A. According to various embodiments, a plurality of folding axes, for example, a first rotation axis P1 and a second rotation axis P2 illustrated in FIG. 3 may be provided. In an embodiment, the housings 110 and 120 may rotate around the folding axis A. When a plurality of folding axes are provided, the first housing 110 may rotate around the first rotation axis P1, and the second housing 120 may rotate around the second rotation axis P2. The folding axis A or the first rotation axis P1 and the second rotation axis P2 may be implemented in various manners according to the design of the hinge module 102.

According to various embodiments, the first housing 110 may be coupled with the hinge structure 102 to rotate around the first rotation axis P1, and include the first face 110a facing a first direction (e.g., the +Z direction) and the second face 110b facing a second direction (e.g., the −Z direction) opposite to the first direction. The second housing 110 may be coupled with the hinge structure 102 to rotate around the second rotation axis P2, include the third face 120a facing a third direction and a fourth face 120b facing a fourth direction opposite to the third direction, rotate upon the hinge structure 102 with respect to the first housing 110. For example, the housings 110 and 120 may rotate with respect to the hinge module 102 and/or with respect to each other, and may rotate reversely with respect to each other according to the design of the hinge module 102. For example, when the first housing 110 rotates clockwise with respect to the hinge module 102, the hinge module 102 may rotate the second housing 120 counterclockwise.

According to various embodiments, the third direction faced by the third face 120a may be the Z-axis direction. The third direction may be defined as the +Z direction or the −Z direction according to the unfolded state or the folded state. For example, the electronic device 100 may be deformed to the folded state or the unfolded state. In an embodiment, the distance between the first rotation axis P1 and the second rotation axis and P2 may vary depending on the design of the hinge module 102. In various embodiments, the first rotation axis P1 and the second rotation axis P2 may be formed substantially in parallel, whereas in other embodiments, the first rotation axis P1 and the second rotation axis P2 may coincide with each other, thus forming the folding axis A of FIG. 1.

According to various embodiments, a plurality of (e.g., a pair of) hinge structures or hinge modules 102 may be arranged apart from each other between the housings 110 and 120. For example, a pair of hinge modules 102 may be arranged apart from each other by a predetermined interval along the Y-axis direction. In an embodiment, a wiring (e.g., a flexible printed circuit board (FPCB)) that electrically couples an internal component of the first housing 110 to an internal component of the second housing 120 may be disposed in the gap or space between the pair of hinge modules 102, crossing the first rotation axis P1 and/or the second rotation axis P2. In an embodiment, the hinge module 102 may be disposed on the inner face of the hinge cover 140. For example, the hinge cover 140 may be coupled with the hinge module 102 between the housings 110 and 120, at least partially surrounding the hinge module 102.

According to various embodiments, the first face 110a may face the third face 120a in the folded state of the electronic device 100, and the third direction may be identical to or parallel to the first direction in the unfolded state of the electronic device 100. For example, the first housing 110 and the second housing 120 may rotate with respect to each other between a first position (e.g., the state illustrated in FIG. 2) at which the first and second housings 110 and 120 are folded to face each other and a second position (e.g., the state illustrated in FIG. 1) at which the first and second housings 110 and 120 are unfolded at a specified angle (e.g., 180 degrees) from the first position. According to an embodiment, the first and third directions may be the +Z direction, and the second and fourth directions may be the −Z direction, in the unfolded state of the electronic device 100. According to an embodiment, the first and fourth directions may be the +Z direction, and the second and third directions may be the −Z direction, in the folded state of the electronic device 100. Unless otherwise specified, directions will be described below based on the unfolded state of the electronic device 100.

According to various embodiments, the first housing 110 and the second housing 120 may be disposed on both sides of the folding axis A (e.g., the rotation axes P1 and P2 in FIG. 3) and may be symmetrical with respect to the folding axis A on the whole. As described in greater detail below, the angle or distance between the first housing 110 and the second housing 120 may be different depending on whether the electronic device 100 is in the unfolded state, the folded state, or an intermediate state. According to an embodiment, the second housing 120 is different from the first housing 110 in that the second housing 120 additionally includes the sensor area 124 in which various sensors are arranged. However, the first and second housings 110 and 120 may be symmetrical with each other in the remaining area except for the sensor area 124.

According to various embodiments, the electronic device 100 may include a structure into which a digital pen (e.g., a stylus pen) is inserted. For example, a hole 123 into which the digital pen may be inserted may be formed into the side face of the first housing 110 or the second housing 120 of the electronic device 100. Since the digital pen may be inserted into the hole 123, a user may be relieved of the inconvenience of carrying the digital pen.

According to various embodiments, the first housing 110 and the second housing 120 may form a recess for accommodating the display 130, as illustrated in FIG. 1. According to an embodiment, the display 130 may be partially asymmetrical in shape due to the sensor area 124.

According to various embodiments, at least a part of each of the first housing 110 and the second housing 120 may be formed of a metal or non-metal material having a rigidity selected to support the display 130. The at least metal part may provide a ground plane for the electronic device 100, and may be electrically coupled to a ground line formed on a printed circuit board (e.g., circuit boards 162 and 164 in FIG. 3).

According to various embodiments, the sensor area 124 may be formed to have an overlapping predetermined area adjacent to one corner of the second housing 120 or at the center of a top end of the display 130. However, the arrangement, shape, and size of the sensor area 124 are not limited to the illustrated example. For example, in an embodiment, the sensor area 124 may be provided at another corner of the second housing 120 or in any area between top and bottom corners of the second housing 120. In an embodiment, components for performing various functions embedded in the electronic device 100 may be exposed from the front face of the electronic device 100 through the sensor area 124 or through one or more openings provided in the sensor area 124. In various embodiments, the components may include various types of sensors. The sensors may include, for example, at least one of a front camera, a receiver, an illuminance sensor, or a proximity sensor.

According to various embodiments, the first rear cover 180 may be disposed on the rear face of the electronic device 100 (e.g., the first housing 110) on one side of the folding axis A. The first rear cover 180 may have, for example, a substantially rectangular periphery which may be surrounded by the first housing 110. Similarly, the second rear cover 190 may be disposed on the rear face of the electronic device 100 (e.g., the second housing 120) on the other side of the folding axis A, with its periphery surrounded by the second housing 120.

According to various embodiments, the first rear cover 180 and the second rear cover 190 may be substantially symmetrical with respect to the folding axis A. However, the first rear cover 180 and the second rear cover 190 are not necessarily symmetrical to each other, and in an embodiment, the electronic device 100 may include the first rear cover 180 and the second rear cover 190 in various shapes. In an embodiment, the first rear cover 180 may be integrally formed with the first housing 110, and the second rear cover 190 may be integrally formed with the second housing 120.

According to various embodiments, the first rear cover 180, the second rear cover 190, the first housing 110, and the second housing 120 may form the space in which various components (e.g., a printed circuit board or a battery) of the electronic device 100 may be arranged. According to an embodiment, one or more components may be arranged or visually exposed (e.g., visible) on the rear face of the electronic device 100. For example, the electronic device 100 may include a sub-display which is at least partially exposed from a first rear area 182 of the first rear cover 180. In an embodiment, one or more components or sensors may be visually exposed from a second rear area 192 of the second rear cover 190. In various embodiments, the sensors exposed from the second rear area 192 may include a proximity sensor and/or a rear camera.

According to various embodiments, the front camera exposed from the front face of the electronic device 100 through one or more openings formed in the sensor area 124 or the rear camera exposed from the second rear area 192 of the second rear cover 190 may include one or more lenses, an image sensor, and/or an image signal processor. In various embodiments, a flash including, for example, a light emitting diode or a xenon lamp may be disposed in the second rear area 192. In various embodiments, two or more lenses (an infrared camera, a wide-angle lens, and a telephoto lens) and image sensors may be disposed on one face of the electronic device 100.

Referring to FIG. 2, the hinge cover 140 may be disposed between the first housing 110 and the second housing 120 and configured to accommodate and cover an internal component (e.g., the hinge structure or hinge module 102 in FIG. 3). According to an embodiment, the hinge cover 140 may be covered by parts of the first housing 110 and the second housing 120 or exposed outward, depending on the state (unfolded or folded state) of the electronic device 100. In an embodiment, at the first position, for example, in the folded state illustrated in FIG. 2, the first housing 110 and the second housing 120 may be substantially folded to face each other, and the hinge cover 140 may be visually exposed outward. In an embodiment, at the second position, for example, in the unfolded state illustrated in FIG. 1, the first housing 110 and the second housing 120 may be unfolded at an angle of 180 degrees from the first position, and the hinge cover 140 may be substantially hidden or accommodated by the first housing 110 and the second housing 120. In another example, in the intermediate state in which the first housing 110 and the second housing 120 are folded with a certain angle, the hinge cover 140 may be partially exposed outward between the first housing 110 and the second housing 120. In this case, however, the exposed area may be smaller than in the folded state. In an embodiment, the hinge cover 140 may include a curved face.

According to various embodiments, the display 130 may be disposed in the space formed by the housings 110 and 120. For example, the display 130 may be mounted in the recess formed by the housings 110 and 120 and form most of the front face of the electronic device 100. Accordingly, the front face of the electronic device 100 may include the display 130, a partial area of the first housing 110 adjacent to the display 130, and a partial area of the second housing 120 adjacent to the display 130. Further, the rear face of the electronic device 100 may include the first rear cover 180, a partial area of the first housing 110 adjacent to the first rear cover 180, the second rear cover 190, and a partial area of the second housing 120 adjacent to the second rear cover 190.

According to various embodiments, the display 130 may refer to a flexible display which may be at least partially deformed into a flat face or a curved face. According to an embodiment, the display 130 may include a folding area 133, a first area 131 disposed on one side of the folding area 133 (e.g., to the left of the folding area 133 in FIG. 1), and a second area 132 disposed on the other side of the folding area 133 (e.g., to the right of the folding area 133 in FIG. 1). The first area 131 may refer to, for example, an area disposed in the first housing 110, and the second area 132 may be an area disposed in the second housing 120. The folding area 133 may connect the first area 131 and the second area 132 to each other. In an embodiment, the folding area 133 may be disposed in correspondence with an area in which the hinge module 102 is disposed, and may be disposed to face the hinge cover 140 with the hinge module 102 interposed therebetween. For example, during a folded operation or an unfolded operation, the folding area 133 may be gradually deformed between the shape of a flat plate and the shape of a curved face having a specified curvature.

The area division of the display 130 illustrated in FIG. 1 is merely an example, and the display 130 may be divided into a plurality (e.g., four or more, or two) areas according to its structure or function. For example, while the area of the display 130 may be divided by the folding area 133 extending in parallel to the Y axis or the folding axis A in the embodiment illustrated in FIG. 1, the area of the display 130 may be divided based on another folding area (e.g., a folding area parallel to an X axis) or another folding axis (e.g., a folding axis parallel to the X axis) in an embodiment. According to an embodiment, the display 130 may be combined with or disposed adjacent to a touch sensing circuit, a pressure sensor for measuring the intensity (pressure) of a touch, and/or a digitizer configured to detect a magnetic field-type stylus pen.

According to various embodiments, the first area 131 and the second area 132 may be symmetrical with respect to the folding area 133 on the whole. However, unlike the first area 131, the second area 132 may include a cut notch or a transparent area according to the presence of the sensor area 124, and may be symmetrical with the first area 131 in the remaining area. In other words, the first area 131 and the second area 132 may be symmetrical in one part and asymmetrical in the other part.

Now, a description will be given of operations of the first housing 110 and the second housing 120 and each area of the display 130 according to the state (e.g., unfolded state or folded state) of the electronic device 100.

According to various embodiments, when the electronic device 100 is in the flat state or the unfolded state (e.g., FIG. 1), the first housing 110 and the second housing 120 may be at a specified angle, for example, 180 degrees, with the first area 131 and the second area 132 of the display 130 facing the same direction. For example, the face of the first area 131 and the face of the second area 132 are at 180 degrees with respect to each other, facing the same direction (e.g., the front direction of the electronic device 100). The folding area 133 may be on the same plane with the first area 131 and the second area 132.

According to various embodiments, when the electronic device 100 is in the folded state (e.g., FIG. 2), the first housing 110 and the second housing 120 may face each other. The face of the first area 131 may face the face of the second area 132 at a narrow angle (e.g., between 0 and 10 degrees). At least a part of the folding area 133 may be a curved face with a specific curvature. As the first housing 110 and the second housing 120 rotate from the folded state to the unfolded state, the curvature of the folding area 133 may gradually decrease.

According to various embodiments, when the electronic device 100 is in the intermediate state, the first housing 110 and the second housing 120 may be at a certain angle, for example, at any of the angles between the first position of FIG. 2 and the second position of FIG. 1. The face of the first area 131 and the face of the second area 132 in the display 130 may be at an angle larger than in the folded state and smaller than in the unfolded state. At least a part of the folding area 133 may be a curved face with a specific curvature which may be smaller than in the folded state.

Referring to FIG. 3, the electronic device 100 may include the housings 110 and 120, the display 130, and the hinge cover 140. The housings 110 and 120 may include the first housing 110, the second housing 120, a bracket assembly 150, the first rear cover 180, the second rear cover 190, and the hinge structure 102.

According to various embodiments, the display 130 may include a display panel 135 and at least one support plate 137 on which the display panel 135 is mounted. The support plate 137 may be disposed between the display panel 135 and the bracket assembly 150.

According to various embodiments, the bracket assembly 150 may include a first mid plate 152 and a second mid plate 154. The hinge structure or hinge module 102 may be disposed between the first mid plate 152 and the second mid plate 154. When viewed from the outside, the hinge structure 102 may be covered by a hinge cover (e.g., the hinge cover 140 in FIG. 2). According to an embodiment, a wiring (e.g., a flexible printed circuit board (FPCB)) may be disposed on the bracket assembly 150, crossing the first mid plate 152 and the second mid plate 154.

According to various embodiments, circuit boards 162 and 164 may include a first circuit board 162 disposed on the first mid plate 152 and a second circuit board 164 disposed on the second mid plate 154. The first circuit board 162 and the second circuit board 164 may be disposed inside the space formed by the bracket assembly 150, the first housing 110, the second housing 120, the first rear cover 180, and the second rear cover 190. Electric/electronic components for executing various functions of the electronic device 100 may be mounted on the first circuit board 162 and the second circuit board 164. In various embodiments, each of the first circuit board 162 and the second circuit board 164 may be interpreted as one of electric/electronic components.

According to various embodiments, with the display 130 coupled with the bracket assembly 150, the first housing 110 and the second housing 120 may be assembled to be coupled with both sides of the bracket assembly 150. For example, the first housing 110 may include a first side member 111 surrounding at least a part of a side face of the first mid plate 152, and the second housing 120 may include a second side member 121 surrounding at least a part of a side face of the second mid plate 154. The first housing 110 may include a first rotation support face 112, and the second housing 120 may include a second rotation support face 122 corresponding to the first rotation support face 112. The first rotation support face 112 and the second rotation support face 122 may include curved faces corresponding to curved faces included in the hinge cover 140. According to an embodiment, the first side member 111 may include the first side face 111a (see FIG. 1) which at least partially surrounds the space between the first face 110a and the second face 110b and is perpendicular to the first direction or the second direction. According to an embodiment, the second side member 121 may include the second side face 121a (see FIG. 1) which at least partially surrounds the space between the third face 120a and the fourth face 120b, and is perpendicular to the third direction or the fourth direction.

According to an embodiment, when the electronic device 100 is in the unfolded state (e.g., the electronic device in FIG. 1), the first rotation support face 112 and the second rotation support face 122 may hide the hinge cover 140 so that the hinge cover 140 may not be exposed or may be exposed to a minimum extent from the rear face of the electronic device 100. For example, in the unfolded state, the hinge cover 140 may be positioned to face the first rotation support face 112 and the second rotation support face 122, and at least partially accommodated in a space formed by the first housing 110 or the second housing 120. In another example, when the electronic device 100 is in the folded state (e.g., the electronic device in FIG. 2), the hinge cover 140 may be exposed outward to a maximum extent from the electronic device 100.

According to various embodiments, the electronic device 100 may include one or more batteries 169a and 169b. For example, the electronic device 100 may include the batteries 169a and 169b disposed in one of the housings 110 and 120 or disposed respectively in the two housings 110 and 120. The batteries 169a and 169b may be disposed substantially adjacent to the circuit boards 162 and 164 and supply power to at least one component of the electronic device 100. According to an embodiment, each of the batteries 169a and 169b may include, for example, a non-rechargeable primary cell, a rechargeable secondary cell, or a fuel cell.

In the following detailed description, the same reference numerals are assigned to or omitted for components that may be readily understood from the above-described embodiments in the drawings, and a detailed description of the components may also be omitted.

FIG. 4 is a sectional view illustrating the electronic device 100 (e.g., the electronic device 100 in FIGS. 1 to 3) according to various embodiments.

FIG. 4 illustrates a cross-section of the electronic device 100, for example, taken along line C-C' of FIG. 2. Referring to FIG. 4, the hinge cover 140 may include a fastening boss 147 formed on the inner face thereof, and may be coupled with the hinge module 102 by the fastening boss 147. In various embodiments, the hinge module 102 may provide a plurality of folding axes (e.g., the first rotation axis P1 and the second rotation axis P2), the first housing 110 may be coupled with the hinge module 102 to rotate around the first rotation axis P1, and the second housing 120 may be coupled with the hinge module 102 to rotate around the second rotation axis P2. Depending on the design of the hinge module 102, the first rotation axis P1 and the second rotation axis P2 may coincide with each other to form one folding axis (e.g., the folding axis A in FIG. 1). In an embodiment, when the first housing 110 rotates counterclockwise in the state illustrated in FIG. 4, the hinge module 102 may rotate the second housing 120 clockwise. For example, the first housing 110 and the second housing 120 may be interlocked with each other by the hinge module 102 to rotate in a reverse direction with respect to each other.

According to various embodiments, in the folded state (e.g., at the position illustrated in FIG. 2), the first housing 110 and the second housing 120 may be disposed to face each other, and the display 130 may include a curved face having a specified curvature (e.g., the folding area 133 in FIG. 3). According to an embodiment, in the intermediate state or the folded state, the hinge cover 140 may be at least partially exposed to the outside, and a stepped portion 119 may be formed between an outer face 149 of the hinge cover 140 and an outer face (e.g., the second face 110b in FIG. 1) of the first housing 110 or the second housing 120. In the unfolded state (e.g., the state illustrated in FIG. 1), the stepped portion 119 of the first housing 110 and a stepped portion of the second housing 120 may be brought into at least partial contact with each other, thereby limiting a range of angles at which the second housing 120 rotates with respect to the first housing 110.

According to various embodiments, the stepped portion 119 is formed by the thickness of a structure that substantially forms the first housing 110 or the first rear cover 180 (e.g., the second housing 120 or the second rear cover 190), which may cause a visual or tactile sense of heterogeneity on the outer face of the electronic device 100 (e.g., the boundaries between the outer face 149 of the hinge cover 140 and the outer face of the housing 110 or 120). In an embodiment, the visual or tactile sense of heterogeneity caused by the stepped portion may be alleviated by reducing the thickness of the structure. In an embodiment, when the thickness of the structure is reduced to alleviate the visual or tactile sense of heterogeneity, the mechanical strength of the first housing 110 or the first rear cover 180 may be reduced, and contact between the first housing 110 and the second housing 120 may lead to deformation of the stepped portion 119.

According to various embodiments, along with rotation of the housings 110 and 120, the hinge cover 140 may be disposed to at least partially move toward or away from the hinge module 102. For example, the size or height of the stepped portion 119 and the visual or tactile sense of heterogeneity caused by the stepped portion 119 may be reduced by moving or deforming the hinge cover 140 so that at least a part thereof is located farther from the hinge module 102 in the folded state than in the unfolded state. For example, the visual or tactile sense of heterogeneity caused by the stepped portion 119 may be reduced in the appearance of the electronic device 100, while a decrease in the mechanical strength of the stepped portion 119 may be prevented and/or reduced. This configuration will be described in greater detail below with reference to FIG. 5.

Figure 5:
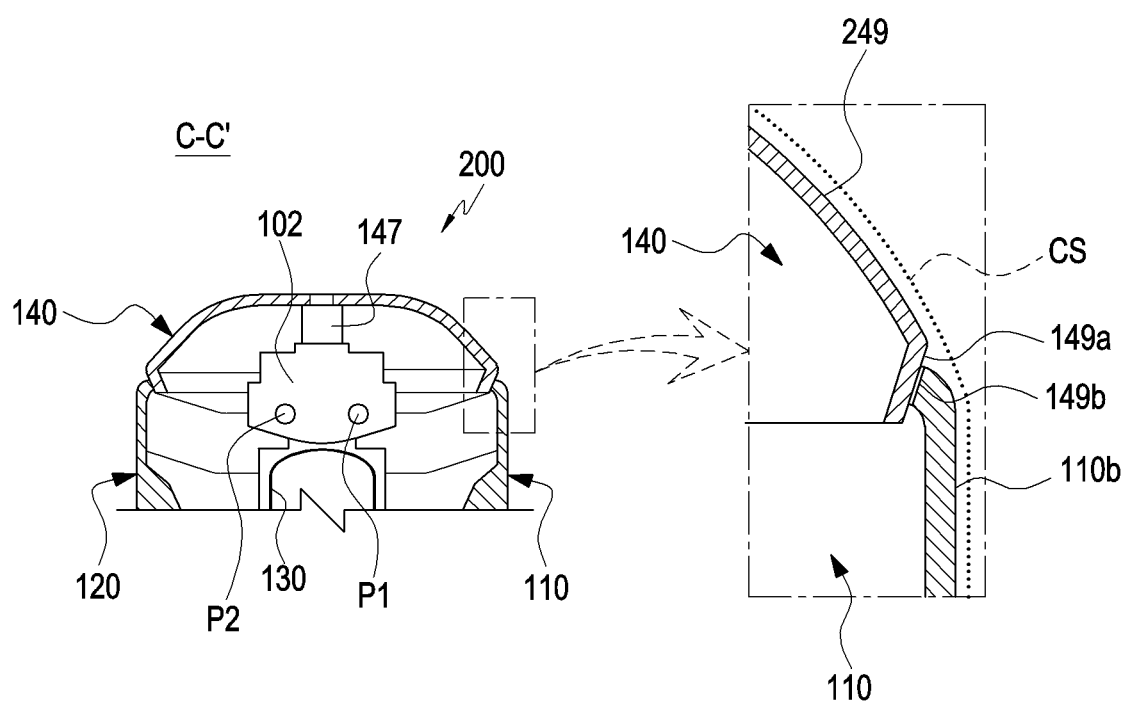
FIG. 5 is a sectional view illustrating an electronic device according to various embodiments.

FIG. 5 is a sectional view illustrating an electronic device 200 (e.g., the electronic device 100 in FIGS. 1 to 3) according to various embodiments.

FIG. 5 illustrates a cross-section the electronic device 200 according to various embodiments, taken along line C-C' of FIG. 2. Referring to FIG. 5, the electronic device 200, the hinge cover 140, and/or the housings 110 and 120 may include a first inclined face 149a and/or a second inclined face 149b. The first inclined face 149a may be formed, for example, on an edge of the hinge cover 140, and the second inclined face 149b may be formed on the first housing 110 and/or the second housing 120. In the folded state of FIG. 5, the second inclined face 149b may be positioned to face the first inclined face 149a, whereas in an unfolding operation, the second inclined face 149b may pass the first inclined face 149a and move along an outer face 249 of the hinge cover 140. For example, as the second inclined face 149b moves along the outer face 249 of the hinge cover 140 past the first inclined face 149a in the unfolding operation, the hinge cover 140 may be gradually accommodated in the first housing 110 or the second housing 120. In various embodiments, when the second inclined face 149b moves from a position at which the second inclined face 149b faces the first inclined face 149a onto the outer face 249 of the hinge cover 140, the first housing 110 (or the second housing 120) may at least partially press the hinge cover 140. The pressing may lead to movement or deformation of at least a part of the hinge cover 140 in a direction closer to the hinge module 102 and gradual movement of the second inclined face 149b from the position at which the second inclined face 149b faces the first inclined face 149a onto the outer face 249 of the hinge cover 140.

According to various embodiments, in the folded state, for example, at the position where the first inclined face 149a faces the second inclined face 149b, the outer face 249 of the hinge cover 140 and the outer face (e.g., the second face 110b in FIG. 1) of the housings 110 and 120 may be disposed to form a substantially continuous inclined face or curved face CS. For example, the visual or tactile sense of heterogeneity caused by the stepped portion 119 of FIG. 4 may be alleviated in the appearance of the electronic device 200. In various embodiments of the disclosure, the wording "continuous inclined face or curved face CS" may not refer to the boundary between components, for example, the boundary between the outer face 249 of the hinged cover 140 and the outer face of the housings 110 and 120 being completely hidden in a visual or tactile sense. For example, although the boundary between the outer face 249 of the hinge cover 140 and the outer face of the housings 110 and 120 may be perceived in a visual or tactile sense, the "boundary" may be merely a recess or line formed on the "continuous inclined face or curved face CS". In an embodiment, "disposed to form a continuous inclined face or curved face CS" may refer, for example, to the outer face 249 of the hinge cover 140 and the outer face of the housings 110 and 120 being adjacent to each other, forming one inclined face or curved face, while the other parts except for the inclined faces 149a and 149b are positioned not to overlap with each other.

According to various embodiments, in the unfolded state, the outer face 249 of the hinge cover 140 may be spaced apart from the outer face of the first housing 110 or the second housing 120 by a distance corresponding to the thickness of the structure forming the first housing 110 or the first rear cover 180 (e.g., the second housing 120 or the second rear cover 190). In an embodiment, in the folded state, the outer face 249 of the hinge cover 140 may be positioned to form a substantially continuous inclined face or curved face CS with the outer face of the first housing 110 or the second housing 120. For example, compared to the unfolded state, the hinge cover 140 may be moved or deformed to be at least partially away from the hinge module 102 in the folded state. Accordingly, in the folded state, for example, in the state in which the hinge cover 140 is at least partially exposed to the outside, stepped portions (e.g., the stepped portion 119 in FIG. 4) at the boundaries between the hinge cover 140 and the housings 110 and 120 may be reduced or concealed, and the visual or tactile sense of heterogeneity may be alleviated.

According to various embodiments, the hinge cover 140 may include at least one of synthetic resin, metal, or carbon fiber and have mechanical rigidity. For example, because the hinge cover 140 is a structure exposed to the outside, the hinge cover 140 may have a strength enough to protect an internal component (e.g., the hinge module). In an embodiment, the hinge cover 140 may be formed into a shape that at least partially surrounds the hinge module 102 and the shape may be a part of a cylinder extending in the Y-axis direction in FIG. 1 or 3. In an embodiment, the hinge cover 140 may be formed into a three-dimensional shape further including faces facing the +Y direction and/or the −Y direction at both Y-axis direction ends thereof. For example, even when the hinge cover 140 is exposed to the outside, the hinge cover 140 may prevent and/or reduce exposure of its inner space to the outside.

Figure 6:
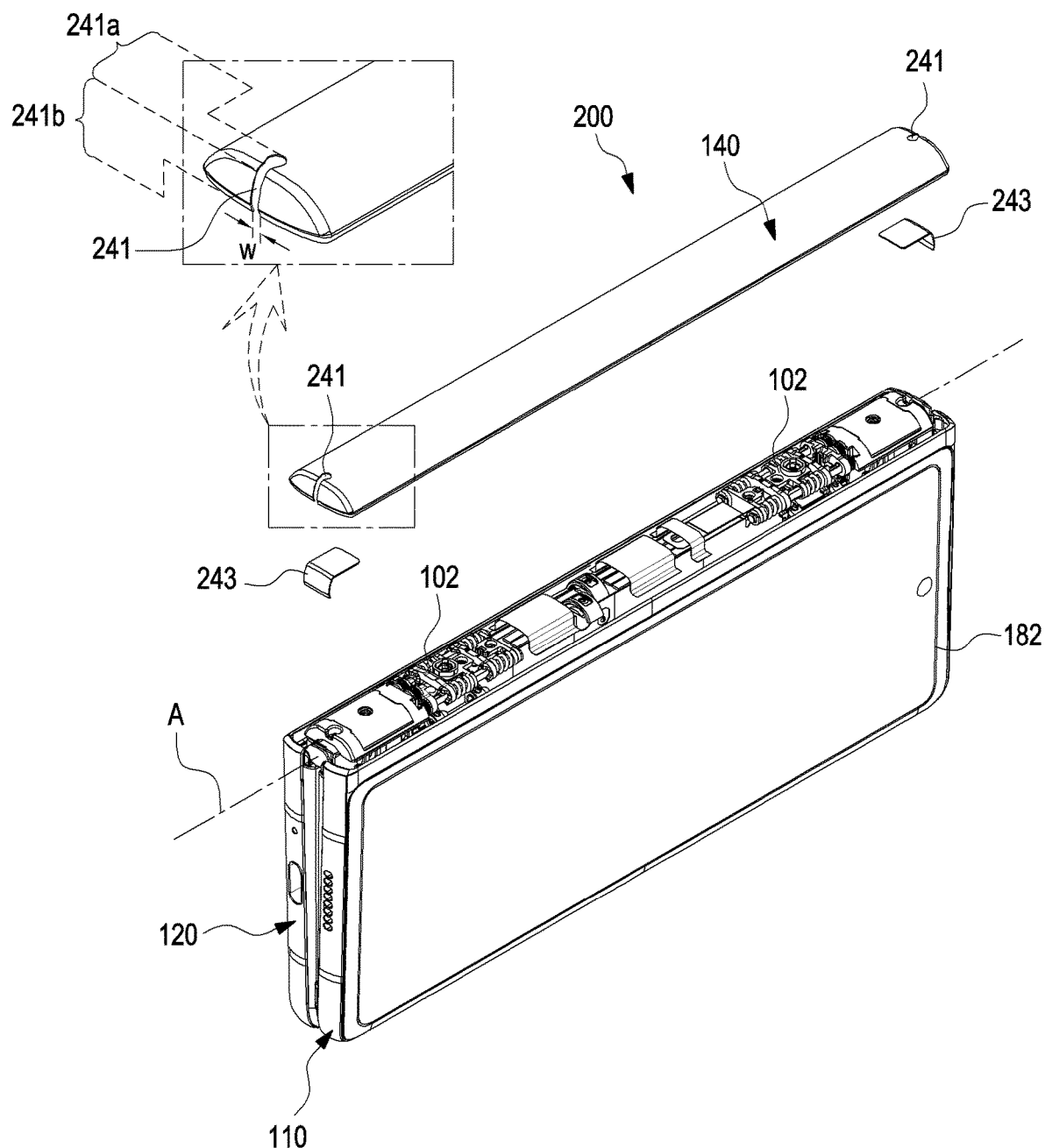
FIG. 6 is a partial exploded perspective view illustrating an electronic device with a hinge cover separated from the electronic device according to various embodiments.
Figure 7:
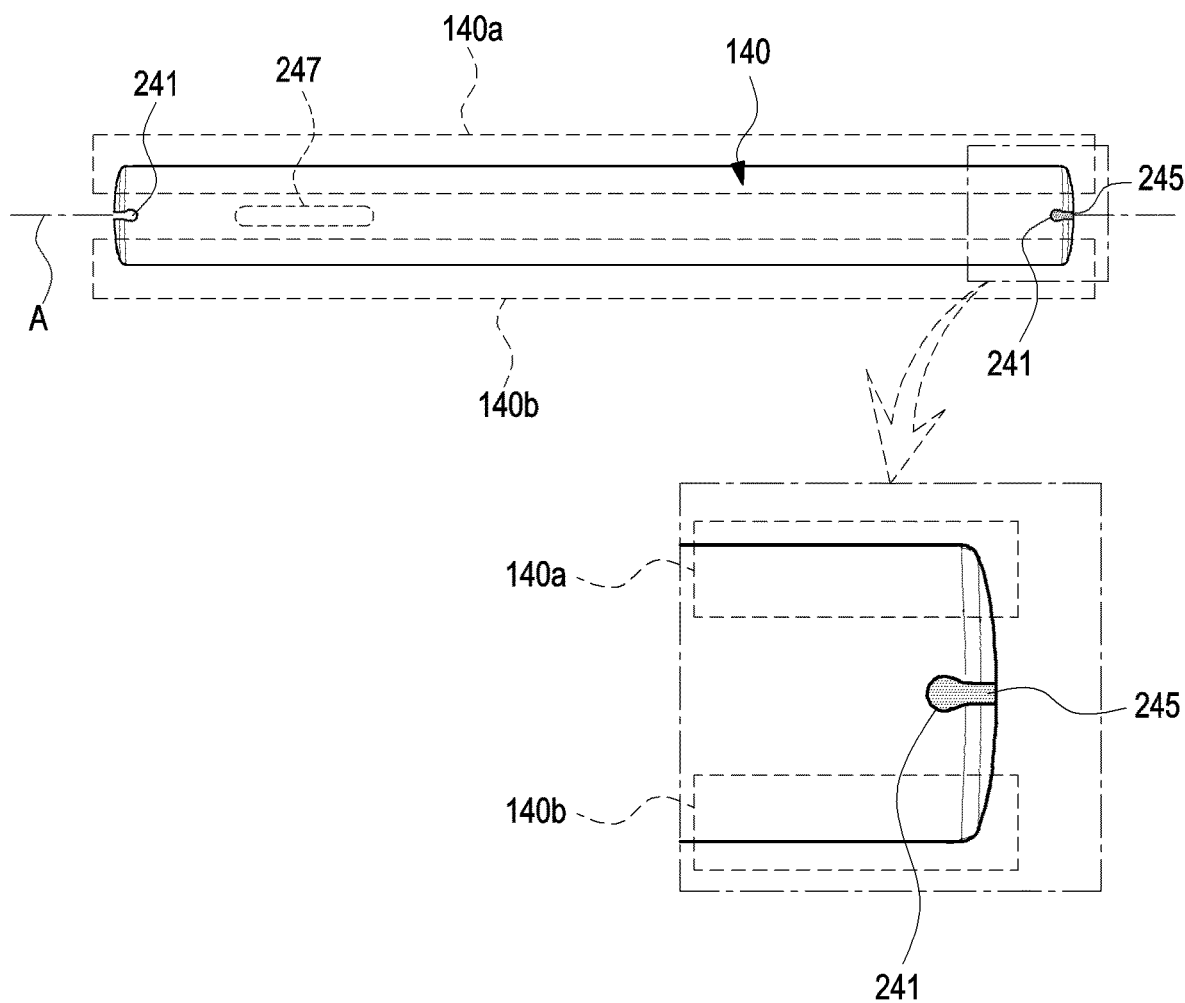
FIG. 7 is a diagram illustrating a hinge cover in an electronic device according to various embodiments.

According to various embodiments, when the hinge cover 140 has a three-dimensional shape, the electronic device 200 and/or the hinge cover 140 may include at least one slit (e.g., a slit 241 in FIG. 6 or 7). The slit(s) 241 may allow or facilitate deformation of the hinge cover 140 so that the hinge cover 140 is at least partially closer to the hinge module 102. The slit 241 of the electronic device 200 and/or the hinge cover 140 will be described in greater detail below with reference to FIGS. 6 and 7.

FIG. 6 is a partial exploded perspective view illustrating the hinge cover 140 separated from the electronic device 200 (e.g., the electronic device 100 in FIGS. 1 to 3) according to various embodiments. FIG. 7 is a diagram illustrating the hinge cover 140 in the electronic device 200 according to various embodiments.

Referring to FIGS. 6 and 7, the slit 241 may be formed on at least one of both ends of the hinge cover 140. In the illustrated embodiment, a slit 241 is shown as formed at each of both ends of the hinge cover 140. The slit 241 may extend to the inside of the hinge cover 140 from at least one of both ends of the hinge cover 140 in the Y-axis direction. For example, the slit 241 may be formed to be at least partially parallel to a folding axis (e.g., the folding axis A in FIG. 1 or the rotation axes P1 and P2 in FIG. 3). In various embodiments, the slit 241 may include a first section 241a parallel to the folding axis A and a second section 241b crossing the folding axis A. The second section 241b may be substantially connected to the first section 241a, and may be formed to cross the face of the hinge cover 140 facing the +Y direction and/or the −Y direction. For example, in the plan view of FIG. 7, only the thickness or width of the second section 241b of the slit 241 may be seen substantially, and may be a part of the length of the first section 241a.

According to an embodiment, the hinge cover 140 may be divided into a first cover portion 140a and a second cover portion 140b with respect to the folding axis A or the slit 241. For example, the first cover portion 140a may be on the side of the first housing 110 and the second cover portion 140b may be on the side of the second housing 120, with respect to the folding axis A of the hinge cover 140. In an embodiment, the slit 241 may be positioned substantially between the first cover portion 140a and the second cover portion 140b. In various embodiments, a fastening boss (e.g., the fastening boss 147 in FIG. 5) may be fixed on the hinge module 102, and when the hinge cover 140 is partially deformed, the first cover portion 140a or the second cover portion 140b may become closer to or farther from the hinge module 102.

According to various embodiments, slits 241 may be formed respectively at both ends of the hinge cover 140, and the lengths or widths of the slit 241 may be selected appropriately in consideration of the appearance of the electronic device 200 or partial deformation of the hinge cover 140. In various embodiments, one slit 241 may be formed to cross the hinge cover 140 along the folding axis A or the Y-axis direction. In an embodiment, the slit 241 may include the second section 241b, without the first section 241a. For example, as the slit 241 is formed to cross the face of the hinge cover 140 facing the +Y direction and/or the −Y direction, partial deformation of the hinge cover 140 may be allowed or facilitated. For example, at least a part of the hinge cover 140 may be deformed to approach or move away from the hinge module 102 by deforming the slit 241, for example, in a manner that decreases or increases the width w of the second section 241b. In an embodiment, the hinge cover 140 may further include a second slit 247 formed between both ends thereof in the Y-axis direction. In various embodiments, the second slit 247 may be filled with a transparent or semi-transparent elastic material, and a light emitting element (e.g., a light emitting diode (LED)) may be disposed in the second slit 247 to provide visual information or signal (e.g. a flashing signal).

According to various embodiments, in the structure with the slit 241 formed therein, the electronic device 200 may further include a first dummy member 243. The first dummy member 243 may be disposed between the hinge module 102 and the hinge cover 140 in correspondence with the slit 241. In various embodiments, the first dummy member 243 may be attached to or closely contact with the inner face of the hinge cover 140. For example, as the first dummy member 243 is disposed to substantially correspond to the slit 241, the first dummy member 243 may prevent and/or reduce visual outward exposure of or introduction of a foreign material into the inner space of the hinge cover 140 through the slit 241. In an embodiment, the electronic device 200 and/or the hinge cover 140 may further include a second dummy member 245 formed of an elastic material filled in the slit 241. For example, the second dummy member 245 may close the slit 241, while allowing the slit 241 to be narrowed or widened because the second dummy member 245 is formed of an elastic material. In an embodiment, when the electronic device 200 and/or the hinge cover 140 includes the second dummy member 245, the first dummy member 243 may be replaced with a light emitting element, and the second dummy member 243 may be formed of a transparent or semi-transparent material. For example, when the first dummy member 243 is replaced with a light emitting element, the second dummy member 245 may at least partially transmit light emitted from the light emitting element. As such, the slit 241 or the second slit 247 may allow partial deformation of the hinge cover 140, while the second dummy member 245 or the elastic material in the second slit 247 may be used to visually conceal the inner space of the hinge cover 140 in the electronic device 200 according to various embodiments of the disclosure.

According to an embodiment, a light emitting element may be disposed in correspondence with the second dummy member 245 or the elastic material in the second slit 247, to function as an indicator. In this case, the second dummy member 245 or the elastic material in the second slit 247 may be semi-transparent.

Figure 8:
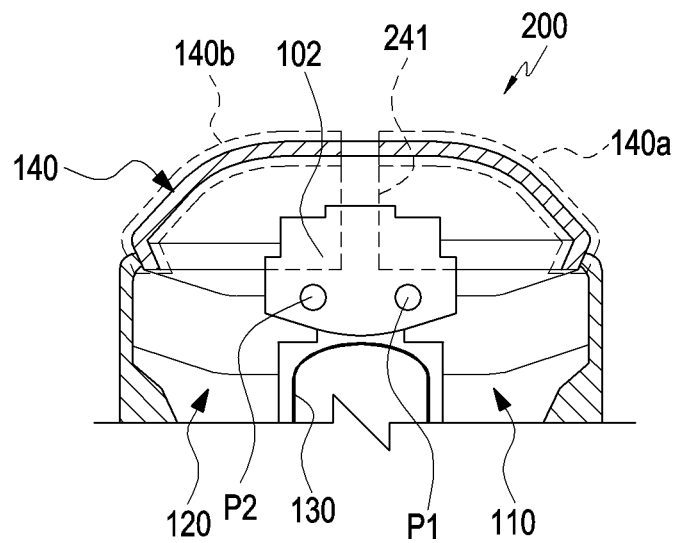
FIG. 8 is a sectional view illustrating an electronic device in a folded state according to various embodiments.
Figure 9:
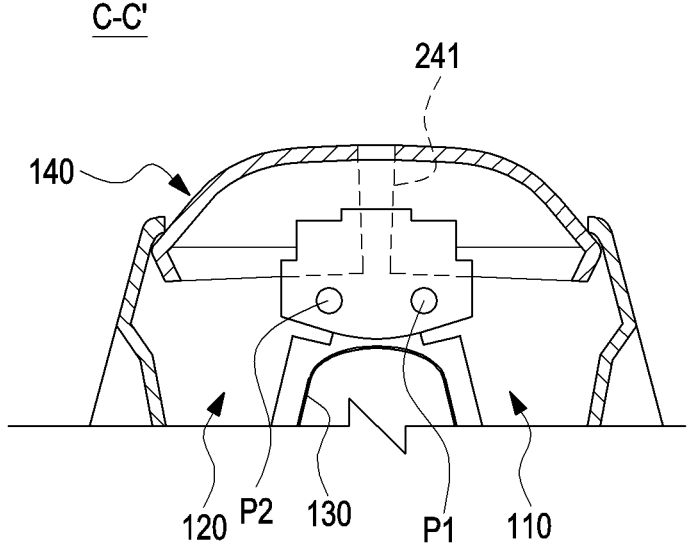
FIG. 9 is a sectional view illustrating an electronic device unfolded at an angle of about 10 degrees according to various embodiments.
Figure 10:
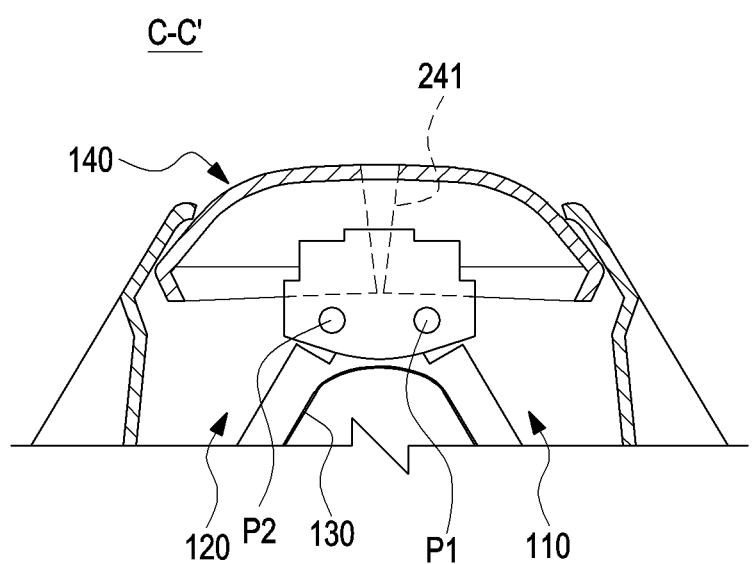
FIG. 10 is a sectional view illustrating an electronic device unfolded at an angle of about 30 degrees according to various embodiments.
Figure 11:
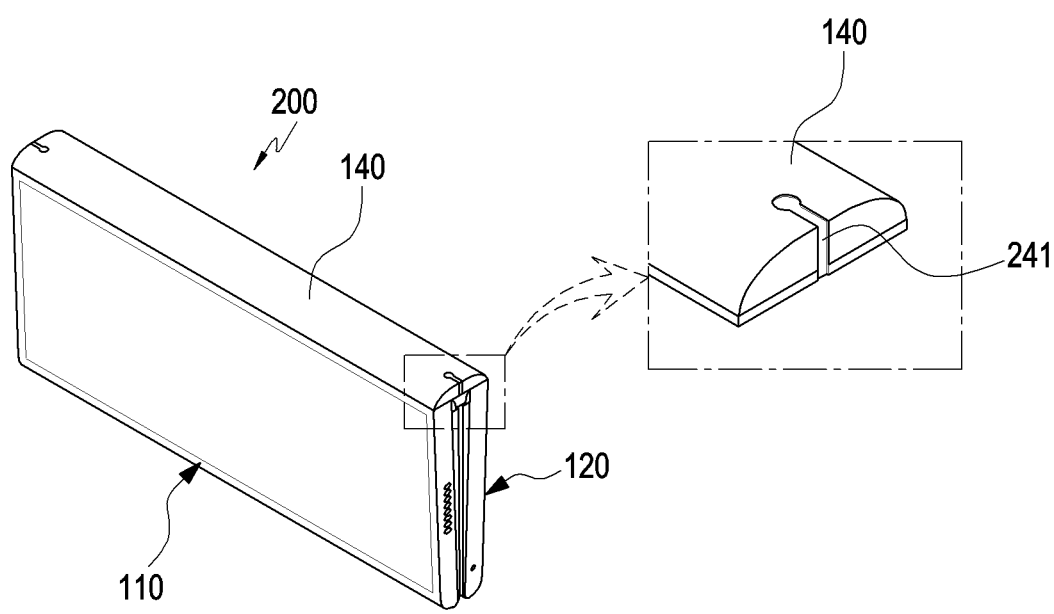
FIG. 11 is a perspective view illustrating an electronic device in a folded state according to various embodiments.
Figure 12:
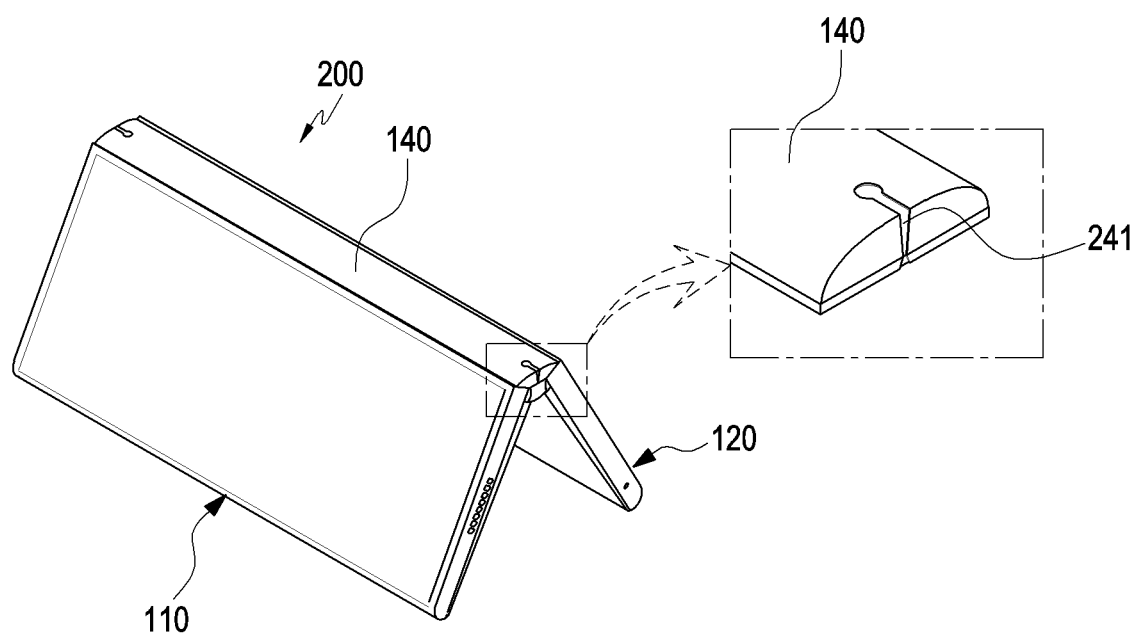
FIG. 12 is a sectional view illustrating an electronic device unfolded at an angle of about 75 degrees according to various embodiments.

FIG. 8 is a sectional view illustrating an example folded state of the electronic device 200 (e.g., the electronic device 100 in FIGS. 1 to 3 and/or the electronic device 200 in FIGS. 5 and 6) according to various embodiments. FIG. 9 is a sectional view illustrating the electronic device 200 unfolded at an angle of approximately 10 degrees according to various embodiments. FIG. 10 is a sectional view illustrating the electronic device 200 unfolded at an angle of approximately 30 degrees according to various embodiments. FIG. 11 is a perspective view illustrating the folded state of the electronic device 200 according to f various embodiments. FIG. 12 is a sectional view illustrating the electronic device 200 unfolded at an angle of approximately 75 degrees according to various embodiments.

Referring to FIGS. 8 and 11, in the folded state, the housings 110 and 120 may be disposed to face each other, and a first area (e.g., the first area 131 in FIG. 1 or 3) and a second area (e.g., the second area 132 in FIG. 1 or 3) of the display 130 may be disposed to at least partially face each other. According to an embodiment, in the folded state, inclined faces (e.g., the first inclined face 149a and the second inclined face 149b in FIG. 5) may be disposed to face each other, and the outer face of the hinge cover 140 may be disposed to form a substantially continuous inclined face or curved face (e.g., the face denoted by 'CS' in FIG. 5) together with the outer faces of the housings 110 and 120. For example, the hinge cover 140 may maintain the slit 241 in the shape of a substantial rectangle by its own elastic force or an elastic force provided by the second dummy member 245 of FIG. 7, and the first cover portion 140a or the second cover portion 140b may be kept at positions farther from the hinge module 102. Accordingly, the hinge cover 140 may maintain its outer face (e.g., the outer face 249 in FIG. 5) at a position at which the outer face forms the continuous inclined face or curved face with the outer faces of the housings 110 and 120. While the slit 241 has been described above as formed into a rectangle, the slit 241 may be described as formed into a triangle in the following description. It is to be noted that the shape of the slit 241 refers to a shape on one end face of the hinge cover 140 as viewed along the Y-axis direction.

According to various embodiments, the hinge cover 140 itself or the second dummy member 245 may exert an elastic force that makes at least a part of the hinge cover 140 (e.g., the first cover portion 1401 or the second cover portion 140b)) further away from the hinge module 102 or maintain or return the at least one part of the hinge cover 140 at or to a designated position. In an embodiment, the second inclined face 149b may restrict receding of the part of the hinge cover 140 from the hinge module 102 at the position at which the second inclined face 149b faces the first inclined face 149a. For example, although the hinge cover 140 provides an elastic force to move the at least one part thereof farther from the hinge module 102, the at least one part of the hinge cover 140 may not move further away from the hinge module 102 at a position set by the second inclined face 149b. Accordingly, the outer face 249 of the hinge cover 140 may be positioned to form the substantially continuous inclined face or curved face (e.g., the face denoted by 'CS' in FIG. 5) with the outer faces of the housings 110 and 120.

Referring to FIGS. 9 and 10 and/or FIG. 12, in the unfolding or folding operation, the housings 110 and 120 may at least partially press the hinge cover 140, and thus the hinge cover 140 may be partially deformed to come closer to the hinge module 102. In an embodiment, the hinge cover 140 may be fixed to the hinge module 102 by a fastening boss (e.g., the fastening boss 147 in FIG. 5), and the first cover portion 140a or the second cover portion 140b may be moved or deformed relative to the fastening boss 147 or with respect to each other. For example, when the housings 110 and 120 move to the unfolded position by rotating around the folding axis A (e.g., the first rotation axis P1 or the second rotation axis P2) in the folded state, the second inclined face 149b may gradually move from the position at which the second inclined face 149b faces the first inclined face 149a onto the outer face 249 of the hinge cover 140. In various embodiments, in the unfolding operation or the folding operation, second inclined faces 149b and/or the inner faces of the housings 110 and 120 may at least partially press the boundaries between first inclined faces 149a and the outer face 249 of the hinge cover 140. For example, the first housing 110 may press the first cover portion 140a while rotating around the first rotation axis P1, and the second housing 120 may press the second cover portion 140b, while rotating around the second rotation axis P2. Therefore, a part (e.g., an edge) of the hinge cover 140 may be moved or deformed in a direction closer to the hinge module 120 and/or the rotation axes P1 and P2. In this embodiment, since the hinge cover 140 is fixed to the hinge module 102 by the fastening member, the hinge cover 140 may be partially deformed by being pressed by the second inclined face 149b and/or the housings 110 and 120. For example, the first cover portion 140a and the second cover portion 140b may move with respect to the fastening boss 147 or with respect to each other.

According to various embodiments, when the hinge cover 140 is partially deformed in a direction closer to the hinge module 102, the width of the slit 241 (e.g., the first section 241a and the second section 241b in FIG. 6) is at least partially narrowed, allowing or facilitating movement of the edge of the hinge cover 140 (e.g., the first inclined face 149a) in the direction closer to the hinge module 102. Although the slit 241 is shown as formed into the shape of an isosceles triangle in FIG. 10, it should be noted that various embodiments of the disclosure are not limited thereto. For example, even though the width of the slit 241 is partially narrowed to allow deformation of the hinge cover 140, the slit 241 may not be shaped into a triangle.

According to various embodiments, in the unfolding operation, the hinge cover 140 may be gradually accommodated in the first housing 110 or the second housing 120, and may be substantially accommodated in the first housing 110 or the second housing 120 at the unfolded position, without being exposed to the outside. For example, the outer face 249 of the hinge cover 140 may be located more inward than the outer faces of the housings 110 and 120. In various embodiments, the hinge cover 140 may be gradually exposed to the outside in the folding operation. When the housings 110 and 120 reach a folding position, the second inclined face 149b may face the first inclined face 149a, and the elastic force of the hinge cover 140 itself or the elastic force of the second dummy member 245 may deform the hinge cover 140, thus arranging the outer face 249 of the hinge cover 140 and the outer faces of the housings 110 and 120 in alignment at positions at which the outer faces form the continuous inclined face or curved face.

Figure 13:
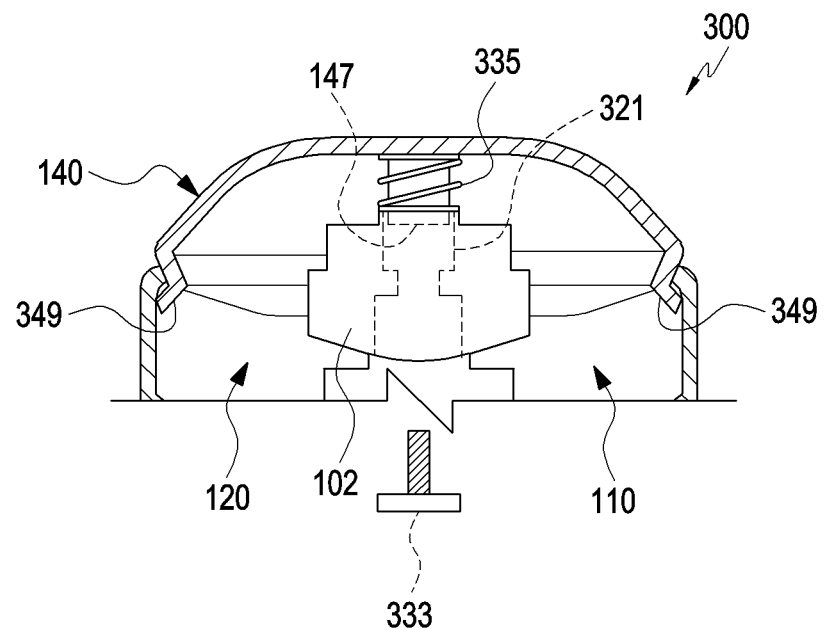
FIG. 13 is a sectional view illustrating an electronic device according to various embodiments.
Figure 14:
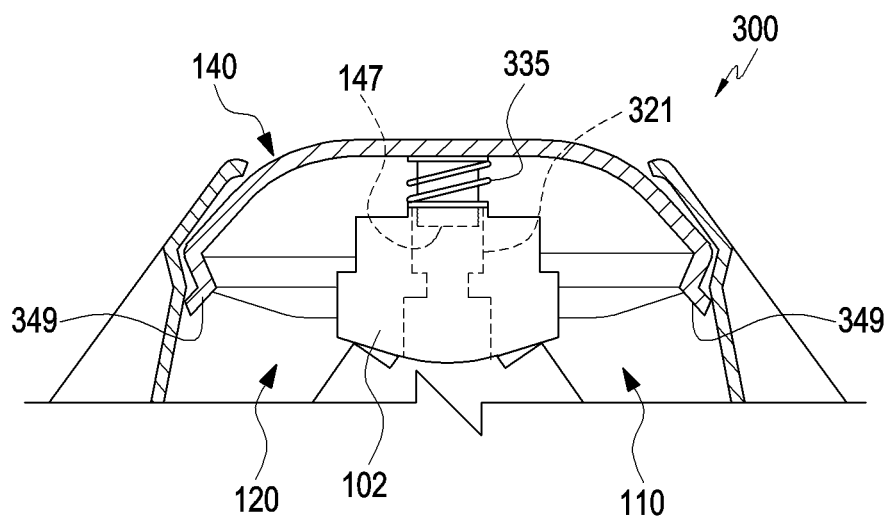
FIG. 14 is a sectional view illustrating an electronic device according to various embodiments.

FIG. 13 is a sectional view illustrating an electronic device 300 (e.g., the electronic device 100 in FIGS. 1 to 3 and/or the electronic device 200 in FIGS. 5 and 6) according to various embodiments. FIG. 14 is a sectional view illustrating the electronic device 300 according to various embodiments.

Referring to FIGS. 13 and 14, the hinge cover 140 may be coupled with the hinge module 120 such that the hinge cover 140 may linearly reciprocate (e.g., move up and down in FIG. 13 or 14). In this case, the hinge cover 140 may be located farther from the hinge module 102 in the folded state than in the unfolded state. According to an embodiment, in the folded state, the outer face of the hinge cover 140 may be positioned to form an inclined face or curved face substantially with the outer faces of the housings 110 and 120. According to an embodiment, the hinge cover 140 may be located closer to the hinge module 102 in the unfolded state than in the folded state and substantially accommodated in the first housing 110 or the second housing 120. For example, in the unfolded state, the outer face of the hinge cover 140 may be located more inward than the outer faces of the housings 110 and 120.

According to various embodiments, the electronic device 300 and/or the hinge module 102 may further include a guide hole 321, a fastening member 333, and/or at least one elastic member 335. The guide hole 321 may be formed to penetrate the hinge module 102, and may accommodate the fastening boss 147 of the hinge cover 140 such that the fastening boss 147 may make a linear reciprocating motion. In an embodiment, the fastening member 333 may penetrate the hinge module 102 through the guide hole 321 in a direction crossing a folding axis (e.g., the folding axis A of FIG. 1) and may be fastened to the hinge cover 140 (e.g., the fastening boss 147). For example, the fastening member 333 may couple or constrain the hinge cover 140 to the hinge module 102 such that the hinge cover 140 may make a linear reciprocating motion. According to an embodiment, the elastic member 335 may be disposed between the hinge module 102 and the hinge cover 140 to provide an elastic force in a direction in which the hinge cover 140 moves away from the hinge module 102. In this embodiment, the elastic member 335 is in the shape of a coil spring and arranged to surround the fastening boss 147 by way of example, which should not be construed as limiting various embodiments of the disclosure. For example, a support groove may be formed in the hinge module 102 or the hinge cover 140, and the elastic member 335 may be disposed with both ends thereof accommodated in the support groove, or a support protrusion and a hole similar to the fastening boss 147 and the guide hole 321 may be additionally formed, and the elastic member 335 may be disposed to surround the support protrusion.

According to various embodiments, in the folded state, a first inclined face and a second inclined face (e.g., the first inclined face 149a and the second inclined face 149b in FIG. 5) may be disposed to face each other, and the hinge cover 140 may be kept at a position away from the hinge module 102 by an elastic force provided by the elastic member 335. In various embodiments, the hinge cover 140 may further include locking protrusion(s) 349 protruding outward (e.g., in the X-axis direction in FIG. 3) from the lower end(s) of the first inclined face(s) 149a. In the folded state, the locking protrusion(s) 349 contacts the inside of any one of the housings 110 and 120 (e.g., the inside of the second inclined face 149b) so that the hinge cover 140 does not move further from the hinge module 102. In various embodiments, a maximum distance or gap between the hinge cover 140 and the hinge module 102 may be substantially set or maintained by the fastening member 333, and thus the locking protrusion(s) 349 may be omitted.

According to various embodiments, in the folded state, the hinge cover 140 may be positioned at a specified distance from the hinge module 102 by the fastening member 333 or the locking protrusion(s) 349. For example, in the folded state, the hinge cover 140 may be aligned at a position where the outer face thereof forms a continuous inclined face or curved face with the outer faces of the housings 110 and 120. According to an embodiment, when the housings 110 and 120 rotate from the folded state and move to the unfolded position, the housings 110 and 120 (e.g., the second inclined face 149b) may move, while pressing the first inclined face 149a or the outer face of the hinge cover 140. As the housings 110 and 120 press, the hinge cover 140 may gradually move in the direction closer to the hinge module 102 to be gradually accommodated in the first housing 110 or the second housing 120. For example, in the unfolded state, the hinge cover 140 may be substantially accommodated in the first housing 110 or the second housing 120, and the outer face of the hinge cover 140 may be located more inward than the outer faces of the housings 110 and 120.

As such, in the electronic devices 100, 200, and 300 according to various embodiments of the disclosure, the hinge cover 140 may be at least partially moved or deformed according to the folded state or the unfolded state of the housings 110 and 120. For example, the hinge cover 140 may be positioned away from the hinge module 102 while being at least partially exposed to the outside in the folded state, whereas the hinge cover 140 may be positioned close to the hinge module 102 while being at least partially concealed by the housings 110 and 120 in the unfolded state. In various embodiments, when the hinge cover 140 is exposed to the outside, the outer face of the hinge cover 140 forms a continuous inclined face or curved face with the outer faces of the housings 110 and 120, thereby alleviating the visual or tactile sense of heterogeneity caused by a height difference or thickness difference (e.g., the stepped portion 119 in FIG. 4) between the outer face of the hinge cover 140 and the outer faces of the housings 110 and 120.

According to various example embodiments, an electronic device (e.g., the electronic device(s) 100, 200, and/or 300 in FIGS. 1 to 3, FIGS. 5 and 6, and/or FIGS. 8 to 14) may include: a first housing (e.g., the first housing 110 in FIGS. 1 to 3, FIGS. 5 and 6, and/or FIGS. 8 to 14), a second housing (e.g., the second housing 120 in FIGS. 1 to 3, FIGS. 5 and 6, and/or FIGS. 8 to 14) rotatably coupled with the first housing and configured to rotate between a first position (e.g., the folded state in FIG. 2) at which the second housing at least partially faces the first housing and a second position (e.g., the unfolded state in FIG. 1) at which the second housing is unfolded at a specified angle from the first position, a hinge module including a hinge (e.g., the hinge module 102 in FIG. 3, FIG. 5, and/or FIG. 13) providing at least one folding axis (e.g., the folding axis A in FIG. 1 and/or the rotation axes P1 and P2 in FIGS. 3 and 5) and rotatably coupling the first housing and the second housing about the folding axis, and a hinge cover (e.g., the hinge cover 140 in FIG. 2, FIG. 3, FIGS. 5 to 7, and/or FIG. 13) disposed between the first housing and the second housing and coupled to surround at least a part of the hinge module, and at least one part of the hinge cover may be located closer to the hinge module at the second position than at the first position.

According to various example embodiments, an outer face of the hinge cover may be configured to form a continuous inclined face or curved face (e.g., the face denoted by 'CS' in FIG. 5) with an outer face of the first housing or the second housing, at the first position, and the hinge cover may be configured to be at least partially accommodated in the first housing or the second housing, at the second position.

According to various example embodiments, during rotation to the second position, the first housing or the second housing may be configured to press the hinge cover to deform or move the at least one part of the hinge cover in a direction closer to the hinge module.

According to various embodiments, the electronic device may further include: a first inclined face (e.g., the first inclined face 149a in FIG. 5) formed on an edge of the hinge cover, and a second inclined face (e.g., the second inclined face 149b in FIG. 5) formed on the first housing or the second housing, the first inclined face and the second inclined face may be configured to face each other at the first position, and as the first housing or the second housing rotates to the second position, the second inclined face may be configured to pass the first inclined face and move along the outer face of the hinge cover.

According to various example embodiments, the hinge cover may include at least one slit (e.g., the slit 241 in FIGS. 6 to 10) extending from at least one of both ends of the hinge cover to an inside of the hinge cover along a direction parallel to the folding axis, and as the first housing or the second housing rotates, the slit may be configured to be at least partially narrowed or widened.

According to various example embodiments, the slit may include a first section (e.g., the first section 241a in FIG. 6) extending along the direction parallel to the folding axis and a second section (e.g., the second section 241b in FIG. 6) connected to the first section and extending along a direction crossing the folding axis.

According to various example embodiments, the electronic device may further include a first dummy piece (e.g., the first dummy member 243 in FIG. 6) disposed between the hinge module and the hinge cover, in correspondence with the slit.

According to various example embodiments, the hinge cover may further include a second dummy member comprising an elastic material (e.g., the second dummy member 245 in FIG. 7) filled in the slit, and the second dummy member may be configured to contract or extend based on deformation of the slit.

According to various example embodiments, the electronic device may further include: a light emitting element comprising light emitting circuitry (e.g., the light emitting element substituting for the first dummy member in FIG. 6) disposed between the hinge module and the hinge cover, in correspondence with the slit, and the second dummy member may be configured to at least partially transmit light emitted from the light emitting element.

According to various example embodiments, the slit may be formed on each of both ends of the hinge cover.

According to various example embodiments, the hinge cover may include a first cover portion (e.g., the first cover portion 140a in FIG. 7 or 8) located on the side of the first housing with respect to the folding axis, and a second cover portion (e.g., the second cover portion 140b in FIG. 7 or 8) located on the side of the second housing with respect to the folding axis, and the slit may be disposed at least partially between the first cover portion and the second cover portion and configured to allow the first cover portion and the second cover portion to be moved or deformed with respect to each other.

According to various example embodiments, during rotation to the second position, the first housing may be configured to press at least a part of the first cover portion, and the second housing may be configured to press at least a part of the second cover portion.

According to various example embodiments, the electronic device may further include: at least one fastener (e.g., the fastening member 333 in FIG. 13) penetrating the hinge module in a direction crossing the folding axis, fastened to the hinge cover, and configured to constrain the hinge cover to the hinge module, while allowing the hinge cover to linearly reciprocate in a specified distance range, and at least one elastic member comprising a coil configured to provide elastic force (e.g., the elastic member 335 in FIG. 13) disposed between the hinge module and the hinge cover, and the elastic member may be configured to provide an elastic force in a direction in which the hinge cover recedes from the hinge module.

According to various example embodiments, the electronic device may further include: at least one fastening boss (e.g., the fastening boss 147 in FIG. 5 or 13) formed on an inner face of the hinge cover, and at least one guide hole (e.g., the guide hole 321 in FIG. 13) formed in the hinge module, the fastener may be fastened to the fastening boss through the guide hole, and the fastening boss may be accommodated in the guide hole, to be allowed to linearly reciprocate therein.

According to various example embodiments, the electronic device may further include: a flexible display (e.g., the display 130 in FIG. 1 or 3) including a first area (e.g., the first area 131 in FIG. 1 or 3) disposed on one face of the first housing, a second area (e.g., the second area 132 in FIG. 1 or 3) disposed on one face of the second housing, and a folding area (e.g., the folding area 133 in FIG. 1 or 3) disposed to face the hinge cover, with the hinge module interposed therebetween. The folding area may connect the first area to the second area and may be deformable into a flat shape or a curved shape. The second area may be configured to be located to at least partially face the first area at the first position, and to be unfolded at a specified angle with respect to the first area at the second position.

According to various example embodiments, the hinge cover may comprise at least one of synthetic resin, metal, or carbon fiber.

According to various example embodiments of the disclosure, an electronic device (e.g., the electronic device(s) 100, 200, and/or 300 in FIGS. 1 to 3, FIG. 5, FIG. 6, and/or FIGS. 8 to 14) may include: a first housing (e.g., the first housing 110 in FIGS. 1 to 3, FIG. 5, FIG. 6, and/or FIGS. 8 to 14), a second housing (e.g., the second housing 120 in FIGS. 1 to 3, FIG. 5, FIG. 6, and/or FIGS. 8 to 14) rotatably coupled with the first housing and configured to rotate between a first position (e.g., the folded state in FIG. 2) at which the second housing at least partially faces the first housing and a second position (e.g., the unfolded state in FIG. 1) at which the second housing is unfolded at a specified angle from the first position, a hinge module including a hinge (e.g., the hinge module 102 in FIG. 3, FIG. 5, and/or FIG. 13) providing at least one folding axis (e.g., the folding axis A in FIG. 1 and/or the rotation axes P1 and P2 in FIGS. 3 and 5) and rotatably coupling the first housing and the second housing about the folding axis, a flexible display (e.g., the display 130 in FIG. 1 or 3) disposed from one face of the first housing to one face of the second housing across an area in which the hinge module is disposed, a hinge cover (e.g., the hinge cover 140 in FIG. 2, FIG. 3, FIGS. 5 to 7, and/or FIG. 13) disposed between another face (e.g., the second face 110b or the first rear cover 180 in FIGS. 1 and 2) of the first housing and another face (e.g., the fourth face 120b or the second rear cover 190 in FIGS. 1 and 2) of the second housing and disposed to at least partially surround the hinge module, a first inclined face (e.g., the first inclined face 149a in FIG. 5) formed on an edge of the hinge cover, and a second inclined face (e.g., the second inclined face 149b in FIG. 5) formed on the first housing or the second housing. The first inclined face and the second inclined face may be configured to face each other at the first position. As the first housing or the second housing rotates to the second position, the second inclined face may be configured to pass the first inclined face and move along an outer face of the hinge cover, and at least one part of the hinge cover may be configured to be located closer to the hinge module at the second position than at the first position.

According to various example embodiments, the hinge cover may include at least one slit (e.g., the slit 241 in FIGS. 6 to 10) extending from at least one of both ends of the hinge cover to the inside of the hinge cover along a direction parallel to the folding axis, and as the first housing or the second housing rotates to the second position, the slit may be configured to be gradually narrowed.

According to various example embodiments, the hinge cover may include a first cover portion (e.g., the first cover portion 140a in FIG. 7 or 8) located on the side of the first housing with respect to the folding axis, and a second cover portion (e.g., the second cover portion 140b in FIG. 7 or 8) located on the side of the second housing with respect to the folding axis, and the slit may be configured to allow the first cover portion and the second cover portion to be moved or deformed with respect to each other.

According to various example embodiments, the electronic device may further include: a first dummy piece (e.g., the first dummy member 243 in FIG. 6) disposed between the hinge module and the hinge cover, in correspondence with the slit.

While the disclosure has been illustrated and described with reference to various example embodiments, it will be understood that the various example embodiments are intended to be illustrative, not limiting. It will further be apparent to those skilled in the art that many modifications can be made without departing from the scope of the disclosure. It will also be understood that any of the embodiment(s) described herein may be used in conjunction with any other embodiment(s) described herein.

What is claimed is:

1. An electronic device comprising:
a first housing;
a second housing rotatably coupled with the first housing through a hinge module and configured to rotate between a first position at which the second housing at least partially faces the first housing and a second position at which the second housing is unfolded from the first position to an angle that is greater at the first position,
wherein the fall hinge module includes a hinge providing at least one folding axis and rotatably coupling the first housing and the second housing about the folding axis; and
a hinge cover disposed between the first housing and the second housing and coupled to surround at least a part of the hinge module,
wherein by moving and/or deforming of the hinge cover based on rotating of the first housing and/or the second housing, at least a portion of the hinge cover is configured to be located further away from the hinge module at the first position than at the second position such that visual and/or tactile sense of heterogeneity in the first position, caused by a stepped portion at boundaries between an outer face of the hinge cover and an outer face of the first or second housing, is reduced.

2. The electronic device of claim 1, wherein an outer face of the hinge cover is configured to form a continuous inclined face or curved face with an outer face of the first housing or the second housing to reduce the visual and/or tactile sense of heterogeneity in the first position, at the first position, and
wherein the hinge cover is configured to be at least partially accommodated in the first housing or the second housing, at the second position.

3. The electronic device of claim 1, wherein during rotation to the second position, the first housing or the second housing is configured to press the hinge cover to deform or move the at least one part of the hinge cover in a direction closer to the hinge module.

4. The electronic device of claim 1, further comprising:
a first inclined face formed on an edge of the hinge cover; and
a second inclined face formed on the first housing or the second housing,
wherein the first inclined face and the second inclined face are configured to face each other at the first position, and
wherein as the first housing or the second housing rotates to the second position, the second inclined face is configured to pass the first inclined face and move along the outer face of the hinge cover.

5. The electronic device of claim 1, wherein the hinge cover includes at least one slit extending from at least one of both ends of the hinge cover to the inside of the hinge cover along a direction parallel to the folding axis, and
wherein as the first housing or the second housing rotates, the slit is configured to be at least partially narrowed or widened.

6. The electronic device of claim 5, wherein the slit includes a first section extending along the direction parallel to the folding axis and a second section connected to the first section and extending along a direction crossing the folding axis.

7. The electronic device of claim 5, further comprising a first dummy piece disposed between the hinge module and the hinge cover, in correspondence with the slit.

8. The electronic device of claim 5, wherein the hinge cover further includes a second dummy member comprising an elastic material filled in the slit, and
wherein the second dummy member is configured to contract or extend based on deformation of the slit.

9. The electronic device of claim 8, further comprising a light emitting element comprising light emitting circuitry disposed between the hinge module and the hinge cover, in correspondence with the slit,
wherein the second dummy member is configured to at least partially transmit light emitted from the light emitting element.

10. The electronic device of claim 5, wherein the slit is formed on each of both ends of the hinge cover.

11. The electronic device of claim 5, wherein the hinge cover includes a first cover portion located on the side of the first housing with respect to the folding axis, and a second cover portion located on the side of the second housing with respect to the folding axis, and wherein the slit is disposed at least partially between the first cover portion and the second cover portion and is configured to allow the first cover portion and the second cover portion to be moved or deformed with respect to each other.

12. The electronic device of claim 11, wherein during rotation to the second position, the first housing is configured to press at least a part of the first cover portion, and the second housing is configured to press at least a part of the second cover portion.

13. The electronic device of claim 1, further comprising:
at least one fastener penetrating the hinge module in a direction crossing the folding axis, fastened to the hinge cover, and configured to constrain the hinge cover to the hinge module, while allowing the hinge cover to linearly reciprocate in a specified distance range; and
at least one elastic member comprising a coil configured to provide elastic force disposed between the hinge module and the hinge cover,
wherein the elastic member is configured to provide an elastic force in a direction in which the hinge cover recedes from the hinge module.

14. The electronic device of claim 13, further comprising:
at least one fastening boss formed on an inner face of the hinge cover; and
at least one guide hole formed in the hinge module,
wherein the fastener is fastened to the fastening boss through the guide hole, and the fastening boss is accommodated in the guide hole, to be allowed to linearly reciprocate therein.

15. The electronic device of claim 1, further comprising:
a flexible display including a first area disposed on one face of the first housing, a second area disposed on one face of the second housing, and a folding area disposed to face the hinge cover, with the hinge module interposed therebetween,
wherein the folding area connects the first area to the second area and is configured to be deformable into a flat shape or a curved shape, and
wherein the second area is configured to at least partially face the first area at the first position, and to be unfolded at a specified angle with respect to the first area at the second position.

* * * * *